United States Patent
Torii et al.

(10) Patent No.: US 11,874,661 B2
(45) Date of Patent: Jan. 16, 2024

(54) BATTERY INSTALLATION SYSTEM, BATTERY INSTALLATION METHOD, AND PROGRAM

(71) Applicant: RAKUTEN GROUP, INC., Tokyo (JP)

(72) Inventors: Junji Torii, Tokyo (JP); Jun Takizawa, Chino (JP)

(73) Assignee: RAKUTEN GROUP, INC., Tokyo (JP)

( * ) Notice: Subject to any disclaimer, the term of this patent is extended or adjusted under 35 U.S.C. 154(b) by 471 days.

(21) Appl. No.: 16/606,228

(22) PCT Filed: Apr. 21, 2017

(86) PCT No.: PCT/JP2017/016083
§ 371 (c)(1),
(2) Date: Oct. 18, 2019

(87) PCT Pub. No.: WO2018/193629
PCT Pub. Date: Oct. 25, 2018

(65) Prior Publication Data
US 2020/0050200 A1 Feb. 13, 2020

(51) Int. Cl.
*B64C 39/02* (2023.01)
*G05D 1/00* (2006.01)
(Continued)

(52) U.S. Cl.
CPC ........... *G05D 1/0088* (2013.01); *B64C 39/02* (2013.01); *B64D 27/24* (2013.01); *B64U 50/19* (2023.01)

(58) Field of Classification Search
None
See application file for complete search history.

(56) References Cited

U.S. PATENT DOCUMENTS 10,328,805 B1 * 6/2019 Wyrobek ................ B60L 53/00
10,663,529 B1 * 5/2020 Bolotski ............... H04W 48/14
(Continued)

FOREIGN PATENT DOCUMENTS

CN     104009501 A    8/2014
CN     105162219 A    12/2015
(Continued)

OTHER PUBLICATIONS

Office Action dated Jul. 8, 2022, for corresponding CN Patent Application No. 201780089870.2 with partial English translation, pp. 1-11.

*Primary Examiner* — Jelani A Smith
*Assistant Examiner* — Davin Seol
(74) *Attorney, Agent, or Firm* — HEA Law PLLC

(57) ABSTRACT

Remaining charge acquisition means of a battery installation system acquires remaining charge information on a remaining charge of each of a plurality of batteries which are installable in an unmanned aerial vehicle. Battery weight acquisition means acquires battery weight information on a weight of each battery. Location acquisition means acquires location information on a movement destination of the unmanned aerial vehicle. Selection means selects, based on the remaining charge information, the battery weight information, and the location information, from among the plurality of batteries, a battery having a remaining charge equal to or more than a battery consumption amount for moving to the movement destination. Processing execution means executes processing for installing the battery selected by the selection means in the unmanned aerial vehicle.

15 Claims, 16 Drawing Sheets

(51) Int. Cl.
*B64D 27/24* (2006.01)
*B64U 50/19* (2023.01)

(56) References Cited

U.S. PATENT DOCUMENTS

| | | | |
|---|---|---|---|
| 10,730,620 B1 * | 8/2020 | Hanlon | B64C 39/024 |
| 2009/0132186 A1 * | 5/2009 | Esnard | G01R 31/3648 |
| | | | 702/63 |
| 2014/0316616 A1 * | 10/2014 | Kugelmass | G05D 1/104 |
| | | | 701/8 |
| 2017/0123420 A1 | 5/2017 | Shi et al. | |
| 2017/0225662 A1 * | 8/2017 | Newman | B60L 50/66 |
| 2018/0043785 A1 * | 2/2018 | Takatsuka | H02J 7/005 |
| 2018/0072168 A1 * | 3/2018 | Heinen | B63G 8/001 |
| 2019/0144108 A1 * | 5/2019 | McCullough | B64C 29/02 |
| | | | 244/23 B |

FOREIGN PATENT DOCUMENTS

| | | |
|---|---|---|
| CN | 106183864 A | 12/2016 |
| JP | 2016-531042 A | 10/2016 |
| JP | 6156006 B2 * | 7/2017 |

* cited by examiner

PLEASE INSTALL FOLLOWING BATTERY IN UNMANNED
AERIAL VEHICLE FOR TRANSPORTING PACKAGE

[PACKAGE INFORMATION]
ORDER ID: 5000001234
ORDERER:TARO YAMADA
PRODUCT:DVD
PACKAGE ID: 0000009876
DELIVERY DESTINATION: ... SETAGAYA CITY, TOKYO
PACKAGE WEIGHT: 0.8kg

[BATTERY INFORMATION]
BATTERY ID: b00003
BATTERY NAME:CCC
BATTERY CAPACITY: 2700mAh
STATE OF CHARGE :100%
BATTERY WEIGHT:160g
PRESENT STATE: BEING CHARGED BY CHARGER XXX

FIG.6

| BATTERY ID | BATTERY NAME | BATTERY CAPACITY | REMAINING CHARGE INFORMATION | BATTERY WEIGHT INFORMATION | PRESENT STATE |
|---|---|---|---|---|---|
| b00001 | AAA | 4480mAh | 40% | 450g | CHARGING |
| b00002 | BBB | 1000mAh | – | 100g | IN-USE |
| b00003 | CCC | 2700mAh | 100% | 160g | CHARGING |
| b00004 | DDD | 3500mAh | 55% | 380g | CHARGING |
| ... | ... | ... | ... | ... | ... |

FIG.7

| PACKAGE ID | ORDER ID | ORDERER INFORMATION | PACKAGE CONTENTS | LOCATION INFORMATION | PACKAGE WEIGHT INFORMATION | BATTERY ID |
|---|---|---|---|---|---|---|
| 0000009876 | 5000001234 | TARO YAMADA | DVD | ... SETAGAYA CITY, TOKYO | 0.8kg | – |
| 0000009877 | 5000001234 | HANAKO SATO | COSMETICS | ... OTA CITY, TOKYO | 0.4kg | b00002 |
| 0000009878 | 5000001234 | JIRO ISHIKAWA | BOOK | ... YOKOHAMA CITY, KANAGAWA | 1.2kg | b00015 |
| 0000009879 | 5000001234 | SABURO TANAKA | HOME ELECTRIC APPLIANCE | ... CHIBA CITY, CHIBA | 2.0kg | – |
| ... | ... | ... | ... | ... | ... | ... |

FIG.8

| TOTAL WEIGHT | FUEL EFFICIENCY |
|---|---|
| LESS THAN 100g | 8m/KJ |
| EQUAL TO OR MORE THAN 100g AND LESS THAN 150g | 7.5m/KJ |
| EQUAL TO OR MORE THAN 151g AND LESS THAN 200g | 7m/KJ |
| EQUAL TO OR MORE THAN 201g AND LESS THAN 250g | 6.5m/KJ |
| ⋮ | ⋮ |

FIG.11

| DISTANCE BETWEEN CENTER OF GRAVITY AND CENTER | FUEL EFFICIENCY |
|---|---|
| LESS THAN 5cm | 1.0 |
| EQUAL TO OR MORE THAN 5cm AND LESS THAN 10cm | 0.95 |
| EQUAL TO OR MORE THAN 10cm AND LESS THAN 15cm | 0.9 |
| EQUAL TO OR MORE THAN 15cm AND LESS THAN 20cm | 0.85 |
| ⋮ | ⋮ |

FIG.12

| TRANSPORTATION METHOD INFORMATION | FUEL EFFICIENCY |
|---|---|
| MOVEMENT SPEED: LESS THAN 3km/h | 0.8 |
| MOVEMENT SPEED: 3km/h OR MORE | 1.0 |
| ALLOWABLE VIBRATION AMOUNT: LOW | 0.8 |
| ALLOWABLE VIBRATION AMOUNT: HIGH | 1.0 |
| ⋮ | ⋮ |

FIG.13

| WIND INFORMATION | FUEL EFFICIENCY |
|---|---|
| NO WIND | 1.0 |
| TAILWIND OF LESS THAN 3m/s | 1.1 |
| TAILWIND OF 3m/s OR MORE | 1.2 |
| HEADWIND OF LESS THAN 3m/s | 0.9 |
| HEADWIND OF 3m/s OR MORE | 0.8 |
| ⋮ | ⋮ |

FIG.14

| TEMPERATURE INFORMATION | ACTUAL REMAINING CHARGE |
|---|---|
| LESS THAN −10°C | 0.8 |
| EQUAL TO OR MORE THAN −10°C AND LESS THAN 5°C | 0.9 |
| EQUAL TO OR MORE THAN 5°C AND LESS THAN 15°C | 0.92 |
| EQUAL TO OR MORE THAN 15°C AND LESS THAN 20°C | 0.95 |
| ... | ... |

BATTERY INSTALLATION SYSTEM, BATTERY INSTALLATION METHOD, AND PROGRAM

CROSS REFERENCE TO RELATED APPLICATIONS

This application is a National Stage of International Application No. PCT/JP2017/016083 filed on Apr. 21, 2017. The contents of the above document is incorporated herein by reference in its entirety.

TECHNICAL FIELD

The present invention relates to a battery installation system, a battery installation method, and a program.

BACKGROUND ART

In recent years, there has been investigated a technology for moving an unmanned aerial vehicle to a predetermined movement destination. For example, in Patent Literature 1, there is disclosed a technology in which a remaining charge of a battery installed in the unmanned aerial vehicle and position coordinates of the unmanned aerial vehicle are acquired in real time, and when there is no remaining charge for returning to a predetermined position, the unmanned aerial vehicle is caused to land at its current position or a safety device mounted on the unmanned aerial vehicle is opened.

CITATION LIST

Patent Literature

[Patent Literature 1] JP 2016-531042 A1

SUMMARY OF INVENTION

Technical Problem

In technology such as that described above, after the unmanned aerial vehicle moves to the movement destination and then returns, the battery is removed from the unmanned aerial vehicle, and charged for the next movement. Then, the charged battery is installed in the unmanned aerial vehicle before the unmanned aerial vehicle moves to the next movement destination. In this case, when a battery without a sufficient remaining charge is installed, the power may become insufficient on the way, and the unmanned aerial vehicle cannot move to the movement destination.

However, in the technology of Patent Literature 1, the remaining charge of the battery is only managed during flight, and the remaining charge of the battery is not managed before flight. As a result, with the technology of Patent Literature 1, it is not possible to prevent installation of a battery that has an insufficient remaining charge. Regarding this point, the certainty of moving to the movement destination can be increased by providing only large capacity batteries having a margin for a remaining charge of the battery, but using a battery having a larger capacity means that the weight of the battery is increased, which causes energy consumption efficiency to deteriorate. For example, when a large capacity battery is used even in a case where the unmanned aerial vehicle is to move to a close location and only requires a small lightweight battery, energy is wastefully consumed as a result of the increased battery weight. For this reason, it is desired to prepare various types of batteries and select a battery that does not wastefully consume energy.

The present invention has been made in view of the above-mentioned problems. It is an object of the present invention to prevent wasteful energy consumption when an unmanned aerial vehicle moves to a movement destination.

Solution to Problem

In order to solve the above-mentioned problems, a battery installation system according to one embodiment of the present invention includes: remaining charge acquisition means for acquiring remaining charge information on a remaining charge of each of a plurality of batteries which are installable in an unmanned aerial vehicle; battery weight acquisition means for acquiring battery weight information on a weight of each battery; location acquisition means for acquiring location information on a movement destination of the unmanned aerial vehicle; selection means for selecting, based on the remaining charge information, the battery weight information, and the location information, from among the plurality of batteries, a battery having a remaining charge equal to or more than a battery consumption amount for moving to the movement destination; and processing execution means for executing processing for installing the battery selected by the selection means in the unmanned aerial vehicle.

A battery installation method according to one embodiment of the present invention includes: a remaining charge acquisition step of acquiring remaining charge information on a remaining charge of each of a plurality of batteries which are installable in an unmanned aerial vehicle; a battery weight acquisition step of acquiring battery weight information on a weight of each battery; a location acquisition step of acquiring location information on a delivery destination or a collection destination of a package; a selection step of selecting, based on the remaining charge information, the battery weight information, and the location information, from among the plurality of batteries, a battery having a remaining charge for transporting the package; and a processing execution step of executing processing for installing the battery selected by the selection means in the unmanned aerial vehicle.

A program according to one embodiment of the present invention causes a computer to function as: remaining charge acquisition means for acquiring remaining charge information on a remaining charge of each of a plurality of batteries which are installable in an unmanned aerial vehicle; battery weight acquisition means for acquiring battery weight information on a weight of each battery; location acquisition means for acquiring location information on a movement destination of the unmanned aerial vehicle; selection means for selecting, based on the remaining charge information, the battery weight information, and the location information, from among the plurality of batteries, a battery having a remaining charge equal to or more than a battery consumption amount for moving to the movement destination; and processing execution means for executing processing for installing the battery selected by the selection means in the unmanned aerial vehicle.

An information storage medium according to one embodiment of the present invention is a computer-readable information storage medium having stored thereon the above-mentioned program.

Further, in one aspect of the present invention, the location information includes information on at least one of a delivery destination or a collection destination of a package to be transported by the unmanned aerial vehicle, the battery installation system further includes package weight acquisition means for acquiring package weight information on the weight of the package, and the selection means is configured to select a battery further based on the package weight information.

Further, in one aspect of the present invention, the selection means is configured to select a battery having the lightest weight when there are a plurality of batteries having a remaining charge equal to or more than the battery consumption amount.

Further, in one aspect of the present invention, the selection means is configured to: acquire, based on the battery weight information and the location information, consumption amount information on the battery consumption amount; and select a battery based on the remaining charge information and the consumption amount information.

Further, in one aspect of the present invention, the location information includes information on at least one of a delivery destination or a collection destination of a package to be transported by the unmanned aerial vehicle, the battery installation system further includes center-of-gravity acquisition means for acquiring center-of-gravity information on a center of gravity exhibited when the package is loaded on the unmanned aerial vehicle, and the selection means is configured to select a battery further based on the center-of-gravity information.

Further, in one aspect of the present invention, the battery installation system further includes transportation method acquisition means for acquiring transportation method information on a transportation method of the package, and the selection means is configured to select a battery further based on the transportation method information.

Further, in one aspect of the present invention, the battery installation system further includes wind acquisition means for acquiring wind information on a wind on a flight route of the unmanned aerial vehicle, and the selection means is configured to select a battery further based on the wind information.

Further, in one aspect of the present invention, the battery installation system further includes temperature acquisition means for acquiring temperature information on a temperature on a flight route of the unmanned aerial vehicle, and the selection means is configured to select a battery further based on the temperature information.

Further, in one aspect of the present invention, the battery installation system further includes remaining charge prediction acquisition means for acquiring remaining charge prediction information on a remaining charge prediction of a battery being charged, and the selection means is configured to select a battery further based on the remaining charge prediction information.

Further, in one aspect of the present invention, the battery installation system further includes time acquisition means for acquiring time information on a time specified for the movement destination, and the remaining charge prediction information means is configured to acquire the remaining charge prediction information based on the time information.

Further, in one aspect of the present invention, the location information includes information on at least one of a delivery destination or a collection destination of a package to be transported by the unmanned aerial vehicle, the battery installation system further includes package size acquisition means for acquiring package size information on a size of the package, and the selection means is configured to select a battery further based on the package size information.

Further, in one aspect of the present invention, the processing is processing of outputting identification information on the battery selected by the selection means and identification information on the package in association with each other.

Further, in one aspect of the present invention, the location information includes information on a delivery destination of a package to be transported by the unmanned aerial vehicle, the unmanned aerial vehicle is configured to be loaded with a package at a departure point, fly to the delivery destination to deliver the package, and return to a return point, and the selection means is configured to: acquire first consumption amount information on the battery consumption amount for flying from the departure point to the delivery destination in a state in which the package is loaded on the unmanned aerial vehicle; acquire second consumption amount information on the battery consumption amount for flying from the delivery destination to the return point in a state in which the package is not loaded on the unmanned aerial vehicle; and select a battery based on the remaining charge information, the first consumption amount information, and the second consumption amount information.

Further, in one aspect of the present invention, the location information includes information on a collection destination of a package to be transported by the unmanned aerial vehicle, the unmanned aerial vehicle is configured to fly from a departure point to the collection destination to collect the package, and return to a return point, and the selection means is configured to: acquire third consumption amount information on the battery consumption amount for flying from the departure point to the collection destination in a state in which the package is not loaded on the unmanned aerial vehicle; acquire fourth consumption amount information on the battery consumption amount for flying from the collection destination to the return point in a state in which the package is loaded on the unmanned aerial vehicle; and select a battery based on the remaining charge information, the third consumption amount information, and the fourth consumption amount information.

Further, in one aspect of the present invention, the location information includes information on each of a delivery destination and a collection destination of a package to be transported by the unmanned aerial vehicle, the unmanned aerial vehicle is configured to fly from a departure point to the collection destination to collect the package, fly to the delivery destination to deliver the package, and return to a return point, and the selection means is configured to: acquire fifth consumption amount information on the battery consumption amount for flying from the departure point to the collection destination in a state in which the package is not loaded on the unmanned aerial vehicle; acquire sixth consumption amount information on the battery consumption amount for flying from the collection destination to the delivery destination in a state in which the package is loaded on the unmanned aerial vehicle; acquire seventh consumption amount information on the battery consumption amount for flying from the delivery destination to the return point in a state in which the package is not loaded on the unmanned aerial vehicle; and select a battery based on the remaining charge information, the fifth consumption amount information, the sixth consumption amount information, and the seventh consumption amount information.

Advantageous Effects of Invention

According to the present invention, it is possible to prevent wasteful energy consumption when an unmanned aerial vehicle transports a package.

BRIEF DESCRIPTION OF DRAWINGS

FIG. 4 is a diagram for illustrating an example of a selection result screen.

FIG. 6 is a table for showing an example of battery data.

FIG. 7 is a table for showing an example of delivery data.

FIG. 8 is a table for showing fuel efficiency of the unmanned aerial vehicle.

FIG. 11 is a table for showing a relationship between fuel efficiency and a distance between a center of gravity and a center.

FIG. 12 is a table for showing a relationship between transportation method information and fuel efficiency.

FIG. 13 is a table for showing a relationship between wind information and fuel efficiency.

FIG. 14 is a table for showing a relationship between temperature information and fuel efficiency.

DESCRIPTION OF EMBODIMENTS

1. Overall Configuration of Battery Installation System

There is now described an example of a battery installation system according to one embodiment of the present invention. In this embodiment, processing to be executed in the battery installation system is described by using an example in which an unmanned aerial vehicle transports a package.

Figure 1:
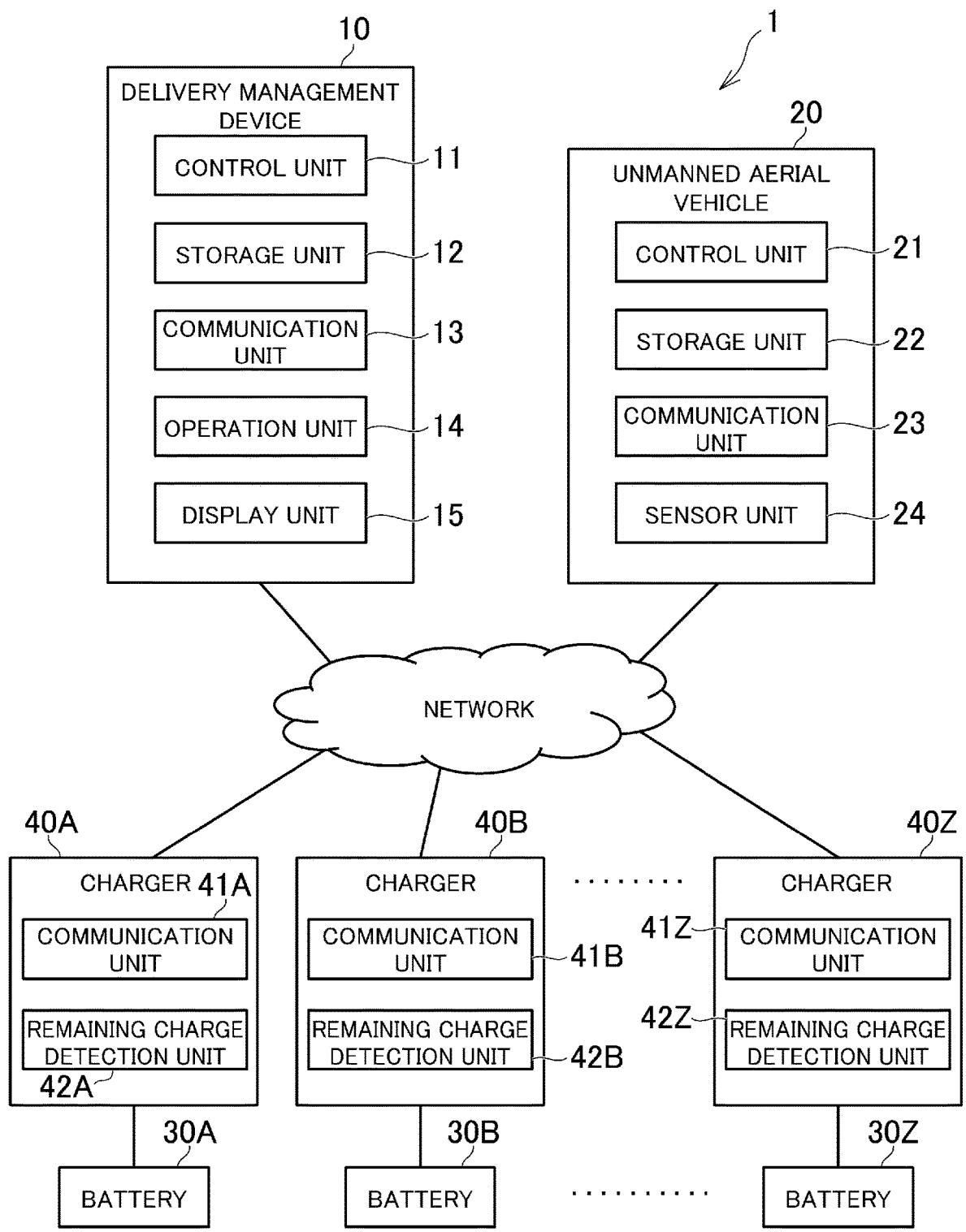
FIG. 1 is a diagram for illustrating an overall configuration of a battery installation system according to one embodiment of the present invention.

FIG. 1 is a diagram for illustrating an overall configuration of the battery installation system. As illustrated in FIG. 1, a battery installation system 1 includes a delivery management device 10, an unmanned aerial vehicle 20, batteries 30A to 30Z, and chargers 40A to 40Z. The delivery management device 10, the unmanned aerial vehicle 20, and the chargers 40A to 40Z are connected to each other so as to be able to transmit and receive data through a network such as the Internet or an intranet. In the following description, when it is not particularly required to distinguish the individual batteries 30A to 30Z and the individual chargers 40A to 40Z, the batteries 30A to 30Z are referred to as a battery 30 and the chargers 40A to 40Z are referred to as a charger 40.

The delivery management device 10 is a computer operated by an administrator, and is, for example, a personal computer, a portable terminal (including a tablet terminal or a smartphone), or a server computer. The administrator may be any person that manages installation of the battery 30. For example, the administrator may be an employee of a delivery company or a staff member of a shop in an Internet shopping mall. The delivery management device 10 includes a control unit 11, a storage unit 12, a communication unit 13, an operation unit 14, and a display unit 15.

The control unit 11 includes, for example, at least one microprocessor. The control unit 11 is configured to execute processing in accordance with programs and data stored in the storage unit 12. The storage unit 12 includes a main storage unit and an auxiliary storage unit. For example, the main storage unit is a volatile memory, such as a random-access memory (RAM), and the auxiliary storage unit is a non-volatile memory, such as a hard disk drive or a flash memory. The communication unit 13 includes a communication interface for wired communication or wireless communication. The communication unit 13 is configured to perform data communication through a network. The operation unit 14 is an input device, and is, for example, a touch panel, a pointing device such as a mouse, or a keyboard. The operation unit 14 is configured to transmit operation content to the control unit 11. The display unit 15 is, for example, a liquid crystal display unit or an organic EL display unit. The display unit 15 is configured to display a screen in accordance with an instruction from the control unit 11.

The unmanned aerial vehicle 20 is an aircraft (so-called drone) on which people do not board. The unmanned aerial vehicle 20 includes a control unit 21, a storage unit 22, a communication unit 23, and a sensor unit 24. The hardware configurations of the control unit 21, the storage unit 22, and the communication unit 23 are the same as those of the control unit 11, the storage unit 12, and the communication unit 13, respectively, and hence a description thereof is omitted here. The unmanned aerial vehicle 20 also includes physical parts such as propellers, a motor, a battery connector (mounting and dismounting mechanism), and a package catcher (rigid holding mechanism), but a description of those parts is omitted here. The sensor unit 24 may include various sensors, for example, a camera, a GPS sensor, an acceleration sensor, a gyro sensor, an infrared sensor, an audio sensor, a brightness sensor, a wind direction and wind speed sensor, a geomagnetic sensor, an altitude sensor, a displacement sensor, a temperature sensor, a heat detection sensor, and a pressure sensor.

The programs and data described as being stored in the storage units 12 and 22 may also be supplied through a network. The hardware configurations of the delivery management device 10 and the unmanned aerial vehicle 20 are not limited to the above-mentioned examples, and various types of computer hardware may be used. For example, the delivery management device 10 and the unmanned aerial vehicle 20 may each include a reading unit (e.g., optical disc drive or memory card slot) for reading a computer-readable information storage medium and an input/output unit (e.g., USB port). In this case, the programs and data stored in the information storage medium may be supplied through the intermediation of the reading unit or the input/output unit. In FIG. 1, one delivery management device 10 and one unmanned aerial vehicle 20 are illustrated, but a plurality of delivery management devices 10 and a plurality of unmanned aerial vehicles 20 may be provided.

The battery 30 is a rechargeable secondary battery. The battery 30 is installable in and uninstallable from the unmanned aerial vehicle 20, and supplies power to the unmanned aerial vehicle 20. Anyone of various types of secondary batteries can be used as the battery 30. For example, the battery 30 may be a nickel-hydrogen battery, a lithium polymer battery, a lithium-ion battery, or a lithium-ferrite battery.

The charger 40 is a device for charging the secondary battery. The charger 40 is connected to a power supply through a power cable, and supplies power to the battery 30. The battery 30 is charged through a reverse reaction that occurs as a result of the power supplied by the charger 40. Any one of various types of chargers may be used as the charger. For example, the charger may be a nickel-hydrogen battery charger, a lithium polymer battery charger, a lithium-ion battery charger, or a lithium-ferrite battery charger.

In this embodiment, the charger 40 includes a communication unit 41 and a remaining charge detection unit 42. The hardware configuration of the communication unit 41 is the same as that of the communication unit 13, and hence a description thereof is omitted here. The remaining charge detection unit 42 is a remaining charge meter capable of detecting the remaining charge of the battery 30, and includes, for example, a battery remaining charge meter IC. Various methods may be employed for the battery remaining charge meter IC. For example, a voltage measurement method, a coulomb counter method, a battery cell modeling method, or an impedance track method may be used. The charger 40 can detect through the remaining charge detection unit 42 the remaining charge of a battery 30 being charged, and periodically transmit the detected remaining charge to an external device (in this example, delivery management device 10) through the intermediation of the communication unit 41.

Various types of hardware may be used for the battery 30 and the charger 40. For example, the remaining charge detection unit 42 may be incorporated in the battery 30. For example, the remaining charge detection unit 42 may be included in the delivery management device 10 or another computer instead of being included in the battery 30 or the charger 40. For example, the battery 30 may include a memory area for storing identification information (e.g., serial number) on itself, and may allow the charger 40 to acquire the identification information on the battery 30 when connected to the charger 40. Similarly, the charger 40 may include a memory area for storing identification information on itself.

2. Outline of Processing in Battery Installation System

Next, an outline of processing in the battery installation system 1 is described. In this embodiment, as an example of a package transportation method, there is described a case in which the unmanned aerial vehicle 20 is loaded with a package at a departure point, flies to a delivery destination to deliver the package, and then returns to a return point. There is also described as an example a case in which a box in which a product ordered by a customer on an online shopping mall is packed corresponds to a package.

Figure 2:
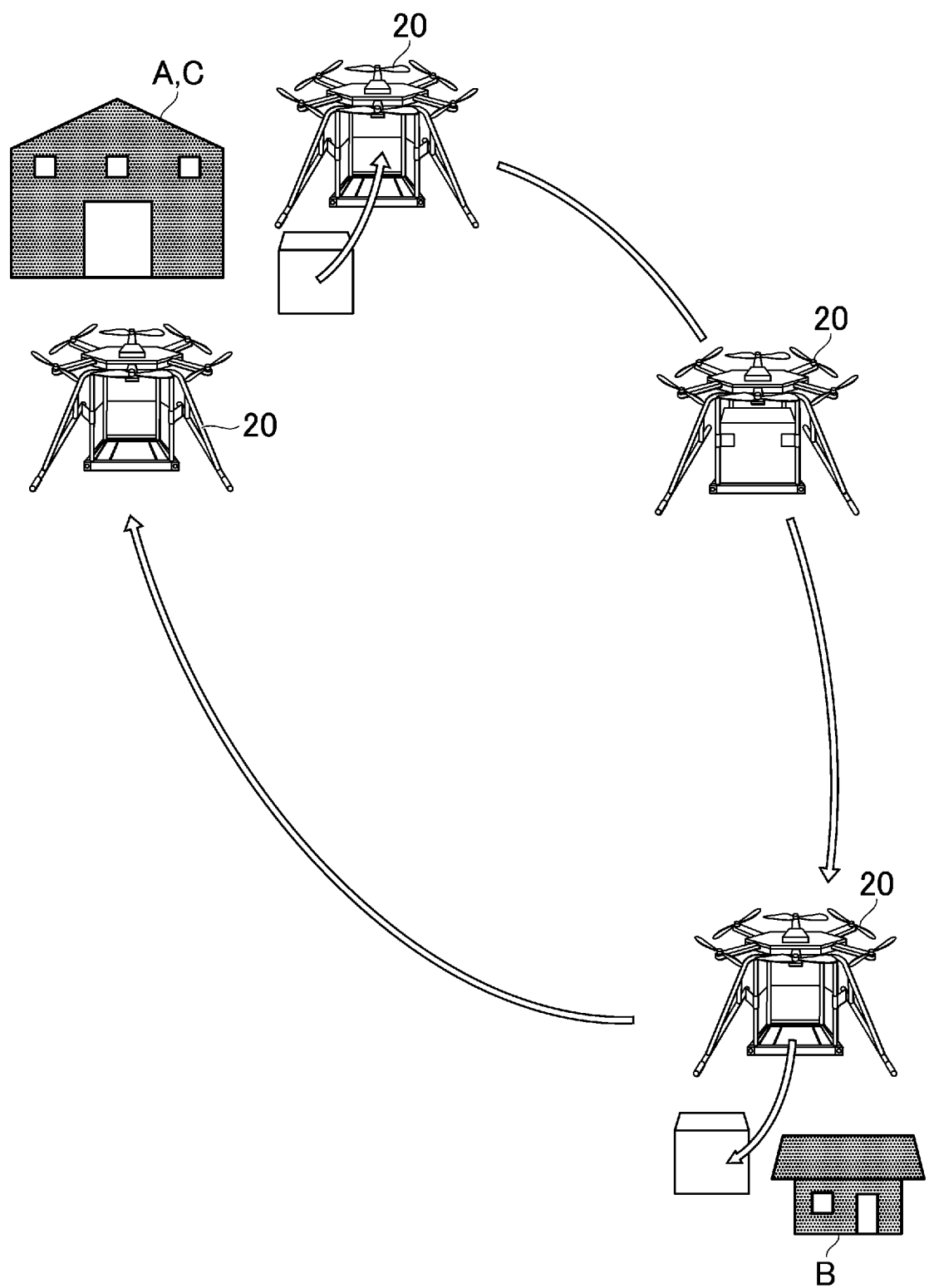
FIG. 2 is a diagram for illustrating how an unmanned aerial vehicle delivers a package.

FIG. 2 is a diagram for illustrating how the unmanned aerial vehicle 20 delivers a package. A departure point A illustrated in FIG. 2 is a location under the management of the administrator. For example, the delivery management device 10, the unmanned aerial vehicle 20, the battery 30, and the charger 40 are present at the departure point A. For example, the departure point A is a package delivery center, a shop shipping packages, or the like. A delivery destination B is a location to which the unmanned aerial vehicle 20 is to deliver the package, for example, the home or office of a recipient. A return point C is a location under the management of the administrator, and is the location to which the unmanned aerial vehicle 20 is to return. The return point C may be the same as or different from the departure point A. In the example of FIG. 2, the departure point A and the return point C are the same.

Figure 3:
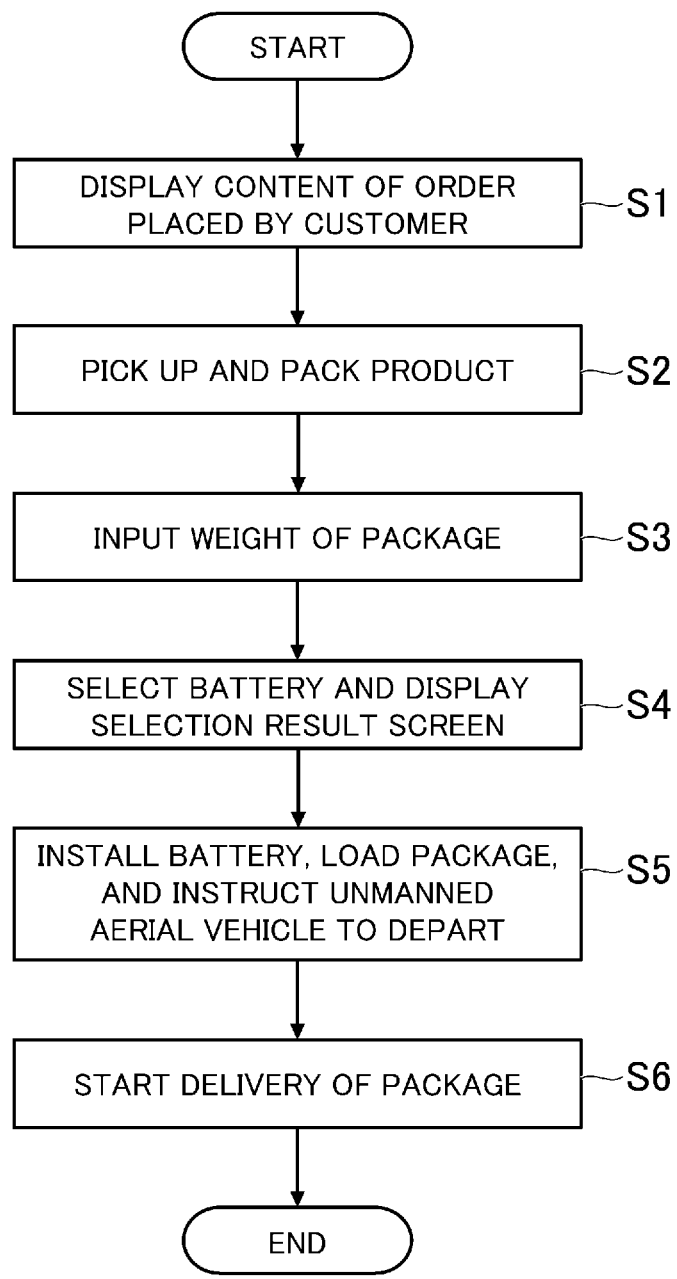
FIG. 3 is a flowchart for illustrating an overall flow in the battery installation system.

FIG. 3 is a flowchart for illustrating an overall flow in the battery installation system 1. As illustrated in FIG. 3, first, the delivery management device 10 displays on the display unit 15 the content of an order placed by the customer (Step S1). Data indicating the content of the order placed by the customer may be stored in advance in the storage unit 12 or may be received by the delivery management device 10 from a customer terminal or a server of an online shopping mall. The content of the order placed by the customer may be printed by a printer instead of being displayed on the display unit 15.

The administrator confirms the content of the order placed by the customer, and then picks up and packs the product (Step S2). For example, the administrator takes the product ordered by the customer from a warehouse, which is located near the departure point A of the unmanned aerial vehicle 20, and packs the product in a dedicated box while fixing the product so that the product does not move. The box for packing the product is not limited as long as the box can be loaded on the unmanned aerial vehicle 20, and has a shape and size determined in advance. As in modification examples described later, in place of the administrator, a robot may pack the product in the box and load the product on the unmanned aerial vehicle 20.

The administrator measures the weight of the package (here, box in which product is packed) by a weighing device, and operates the operation unit 14 to input the weight of the package (Step S3). As the weighing device, a digital scale or an analog scale may be used. The delivery management device 10 and the weighing device may be connected so as to be able to transmit and receive data to/from each other, to thereby omit the input of the weight by the administrator.

The delivery management device 10 selects a battery 30 having a sufficient remaining charge, and displays on the display unit 15 a selection result screen indicating the selection result (Step S4). In Step S4, the delivery management device 10 calculates a battery consumption amount required for the delivery in consideration of the weight of each battery 30, selects a battery 30 having a remaining charge equal to or more than the required battery consumption amount, and displays the selection result screen. This step is described in detail later.

FIG. 4 is a diagram for illustrating an example of a selection result screen G. As illustrated in FIG. 4, information on the package to be delivered and information on the selected battery 30 are displayed in association with each other on the selection result screen G. Specifically, information on the battery 30 to be installed in the unmanned aerial vehicle 20 for transporting the package to be delivered is displayed on the selection result screen G. In this embodiment, when there are a plurality of batteries 30 having a remaining charge equal to or more than the consumption amount required for the delivery, from the viewpoint of energy efficiency, the battery 30 with the lightest battery weight is displayed. In place of the selection result screen G being displayed on the display unit 15, the same content as that of the selection result screen G may be printed by a printer.

The administrator confirms the selection result screen G, installs the battery 30 in the unmanned aerial vehicle 20, loads the package, and instructs the unmanned aerial vehicle 20 to depart (Step S5). A departure instruction may be issued from, for example, the operation unit 14 or a controller for operating the unmanned aerial vehicle 20. When the departure instruction is issued, the delivery management device 10 transmits to the unmanned aerial vehicle 20 a departure instruction notification including information on the delivery destination B. Information on the departure point A and information on the return point C may also be included in the departure instruction notification, or may be stored in the storage unit 22 of the unmanned aerial vehicle 20.

When the unmanned aerial vehicle 20 receives the departure instruction notification, the unmanned aerial vehicle 20 starts the delivery of the package (Step S6). In Step S6, the unmanned aerial vehicle 20 identifies its current position based on the GPS sensor of the sensor unit 24, and determines a flight route from the departure point A to the delivery destination B. The flight route may be determined by using any one of various route search algorithms. For example, Dijkstra's algorithm or A* search algorithm may be used, or the shortest distance in which at least obstacles can be avoided may be used as the flight route. After determining the flight route, the unmanned aerial vehicle 20 departs for the delivery destination B. The flight route may also be determined by the delivery management device 10.

During flight, the unmanned aerial vehicle 20 controls propeller rotation so as to fly along the flight route based on the current position identified by the GPS sensor of the sensor unit 24. The automatic flight control itself of the unmanned aerial vehicle 20 can be performed by using any one of various known methods. For example, the unmanned aerial vehicle 20 controls a movement direction so that a deviation between the latitude and longitude of its current position and the latitude and longitude on the flight route falls within a threshold value. During flight, the unmanned aerial vehicle 20 compares the latitude and longitude of its current position with the latitude and longitude of the delivery destination B to determine whether or not the unmanned aerial vehicle 20 has arrived at the delivery destination B. When the unmanned aerial vehicle 20 has arrived at the delivery destination B, the unmanned aerial vehicle 20 starts to descend. When the unmanned aerial vehicle 20 confirms that the unmanned aerial vehicle 20 has landed by using a pressure sensor or the like of the sensor unit 24, the unmanned aerial vehicle 20 opens the catcher and places the package on the ground or the like.

The unmanned aerial vehicle 20 then starts to fly toward the return point C. The flight route from the delivery destination B to the return point C and the flight route from the departure point A to the delivery destination B may be the same or different. The unmanned aerial vehicle 20 compares the latitude and longitude of its current position with the latitude and longitude of the return point C to determine whether or not the unmanned aerial vehicle 20 has arrived at the return point C. When the unmanned aerial vehicle 20 has arrived at the return point C, the unmanned aerial vehicle 20 starts to descend and lands. When the unmanned aerial vehicle 20 returns to the return point C, the administrator removes the battery 30 from the unmanned aerial vehicle 20, installs the battery 30 in the charger, and charges the battery 30 for the next delivery.

In this way, the battery installation system 1 selects, from among the batteries 30 having a remaining charge equal to or more than the battery consumption amount required for the delivery, the optimal battery 30 for preventing wasteful energy consumption in consideration of the battery weight of each battery 30. This technology is now described in detail (in particular, processing details of Step S4).

3. Functions to be Implemented in Battery Installation System

Figure 5:
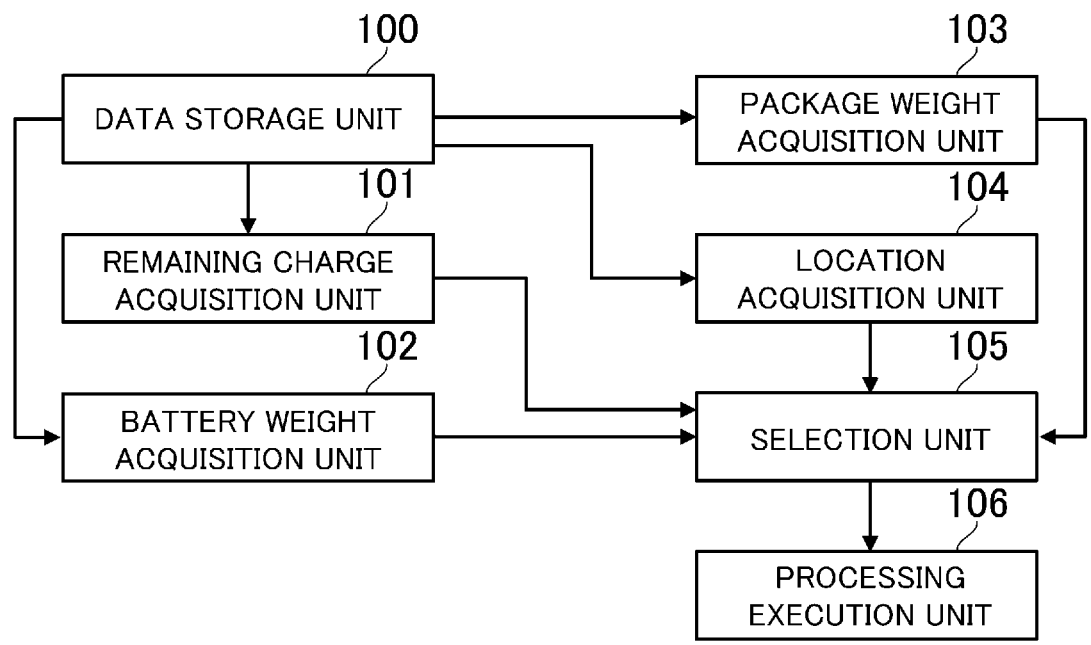
FIG. 5 is a functional block diagram for illustrating an example of functions to be implemented in the battery installation system.

FIG. 5 is a functional block diagram for illustrating an example of the functions to be implemented in the battery installation system 1. As illustrated in FIG. 5, a data storage unit 100, a remaining charge acquisition unit 101, a battery weight acquisition unit 102, a package weight acquisition unit 103, a location acquisition unit 104, a selection unit 105, and a processing execution unit 106 are to be implemented in the battery installation system 1. In this embodiment, there is described a case in which each of those functions is implemented by the delivery management device 10.

[3-1. Data Storage Unit]

The data storage unit 100 is mainly implemented by the storage unit 12. The data storage unit 100 stores data for selecting the optimal battery 30. In this example, battery data in which various kinds of information relating to the battery 30 are stored, and delivery data in which various kinds of information relating to the delivery of the package are stored, are described as the data stored by the data storage unit 100.

FIG. 6 is a table for showing an example of the battery data. As shown in FIG. 6, the battery data indicates basic information and a present state of the battery 30. For example, in the battery data, a battery name, a battery capacity (e.g., capacity decreases when battery 30 degrades), remaining charge information on the battery remaining charge, battery weight information on the battery weight, and a present state are stored in association with a battery ID uniquely identifying the battery 30. The remaining charge information and the battery weight information are described in detail later.

The battery name is a name represented by a character string that allows the battery 30 to be identified more easily than the battery ID. For example, the battery name may be printed on a label attached to the surface of the battery 30, or may be readable by an RFID. The battery capacity is information on a total usable power when a charge rate is 100% (so-called full charge). For example, in a case in which the specifications of the battery 30 (value published by manufacturer) are input in advance, the battery capacity may be expressed, for example, in units of mAh or Ah, and can also be expressed as a numerical value indicating how long a constant-value current can be kept flowing. There is a possibility that the battery 30 may have degraded, and therefore a numerical value obtained by reducing the value published by the manufacturer by the degraded amount may be stored as the battery capacity. As the numerical value, a value input by the administrator may also be stored.

The present state is information for identifying whether or not the battery 30 is usable. For example, information indicating one of "in-use" and "charging" is stored therein. The present state may be, for example, set to "in-use" when the battery 30 is removed from the charger 40 and to "charging" when the battery 30 is installed in the charger 40.

FIG. 7 is a table for showing an example of the delivery data. As shown in FIG. 7, the delivery data indicates basic information and the delivery contents of the package. For example, in the delivery data, an order ID uniquely identifying the order placed by the customer, orderer information, the contents of the package (order content), location information on the delivery destination, package weight information on the weight of the package, and the battery ID are stored in association with the package ID uniquely identifying the package. The location information and the package weight information are described in detail later.

The orderer information is information on the customer who ordered the product. The orderer information may also be printed on a label attached to the package. The contents of the package are the product ordered by the customer. The battery ID is the battery ID of the battery 30 installed in the unmanned aerial vehicle 20. A package for which a battery ID is not stored is a package for which the battery 30 to be installed has not yet been decided.

The data stored in the data storage unit 100 is not limited to the above-mentioned example. For example, the data storage unit 100 may store order data indicating the content of the order placed by the customer, and may also store map data representing a map of the Earth. For example, the data storage unit 100 may also store a correspondence table of addresses and latitude and longitude information, and may store a route search algorithm for flight route calculation.

[3-2. Remaining Charge Acquisition Unit]

The remaining charge acquisition unit 101 is mainly implemented by the control unit 11. The remaining charge acquisition unit 101 acquires remaining charge information on the remaining charge of each of the plurality of batteries 30 installable in the unmanned aerial vehicle. The remaining charge information may be any information that enables the remaining charge of the battery 30 to be identified. In this embodiment, there is described a case in which the remaining charge information is the state of charge at present (e.g., units are %). The state of charge is the charge amount at present based on the whole capacity of the battery 30. The remaining charge information may be a numerical value indicating the present charge amount itself (e.g., units are mAh, i.e., value obtained by multiplying capacity by the state of charge).

In this embodiment, the delivery management device 10 periodically acquires remaining charge information from each charger 40, and updates the remaining charge information stored in the battery data. Therefore, the remaining charge information stored in the battery data indicates the latest remaining charge of each battery 30. The remaining charge acquisition unit 101 acquires the remaining charge information by referring to the battery data. When the remaining charge information is not particularly stored in the battery data, the remaining charge acquisition unit 101 may acquire the remaining charge information directly from the charger 40.

[3-3. Battery Weight Acquisition Unit]

The battery weight acquisition unit 102 is mainly implemented by the control unit 11. The battery weight acquisition unit 102 acquires battery weight information on the weight of each battery. The battery weight information may be any information that enables the weight of the battery 30 to be identified. In this embodiment, there is described a case in which the battery weight information is a value indicating the weight of the battery 30. The battery weight information is not limited to a numerical value, and may be a character indicating a weight rank of the battery 30.

In this embodiment, the battery weight information is stored in advance in the battery data. Therefore, the battery weight acquisition unit 102 acquires the battery weight information by referring to the battery data. When the battery weight information is not particularly stored in the battery data, the battery weight acquisition unit 102 may acquire the battery weight information from the weighing device, or may acquire the battery weight information based on input received from the administrator.

[3-4. Package Weight Acquisition Unit]

The package weight acquisition unit 103 is mainly implemented by the control unit 11. The package weight acquisition unit 103 acquires package weight information on the weight of a package. The package weight information may be any information that enables the weight of the package to be identified. In this embodiment, there is described a case in which the package weight information is a value indicating the weight of the package itself. The package weight information is not limited to a numerical value, and may be a character indicating a weight rank of the package. When the product is packed in a box as in this embodiment, the package weight information may indicate a weight before the box packing or may indicate a weight after the box packing.

In this embodiment, the package weight information is stored in advance in the delivery data. Therefore, the package weight acquisition unit 103 acquires the package weight information by referring to the delivery data. When the package weight information is not particularly stored in the delivery data, the package weight acquisition unit 103 may acquire the package weight information from the weighing device, or may acquire the package weight information based on input received from the administrator. Further, for example, the package weight acquisition unit 103 may store in the data storage unit 100 a standard weight for each product item, and acquire package weight information estimated from the standard weight associated with the product.

[3-5. Location Acquisition Unit]

The location acquisition unit 104 is mainly implemented by the control unit 11. The location acquisition unit 104 acquires location information on a movement destination of the unmanned aerial vehicle 20. The movement destination is the location to which the unmanned aerial vehicle 20 is to move, and can be referred to as an intended destination. In this embodiment, the delivery destination of the package is described as an example of the movement destination. Therefore, in the following description, the terms "delivery destination of the package" or "delivery destination" may be read as "movement destination". The location acquisition unit 104 acquires location information on the delivery destination B of the package to be transported by the unmanned aerial vehicle 20.

In this embodiment, the location information may be any information that enables the delivery destination B of the package to be identified, and may be, for example, an address or latitude and longitude information. In this embodiment, the location information is stored in advance in the delivery data, and therefore the location acquisition unit 104 acquires the location information by referring to the delivery data. When the location information is not particularly stored in the delivery data, the location acquisition unit 104 may acquire the location information from a computer other than the delivery management device 10, or may acquire the location information based on input received from the administrator.

[3-6. Selection Unit]

The selection unit 105 is mainly implemented by the control unit 11. The selection unit 105 selects, from among the plurality of batteries 30, a battery 30 having a remaining charge equal to or more than the battery consumption amount for moving to the delivery destination B based on the remaining charge information, the battery weight information, and the location information. It suffices that the selection unit 105 selects at least one battery 30. For example, the selection unit may select only one battery 30, or may select a plurality of batteries 30. When there are no batteries 30 having a remaining charge for transporting the package, no battery 30 is selected.

The battery consumption amount is the power (energy consumption amount) required for the unmanned aerial vehicle 20 to move to the movement destination and perform a predetermined operation. For example, the battery consumption amount is the power consumed by the unmanned aerial vehicle 20 moving to the delivery destination B, completing a predetermined operation, and returning to the return point C. The predetermined operation is an operation for the purpose of which the unmanned aerial vehicle 20 is to move to the movement destination, and may also be referred to as a service to be provided by the unmanned aerial vehicle (in this embodiment, package delivery service). In this embodiment, there is described a case in which the delivery of the package corresponds to the predetermined operation, and therefore the battery consumption amount can be referred to as the power consumed until transportation of the package is finished.

A remaining charge equal or more than the battery consumption amount means that the value indicated by the remaining charge information is equal to or more than the battery consumption amount. In other words, a remaining charge equal or more than the battery consumption amount is a battery remaining charge enabling an outward flight (route from departure point A to delivery destination B) and a return flight (route from delivery destination B to return point C). In this embodiment, the selection unit 105 selects a battery 30 having a remaining charge enabling the unmanned aerial vehicle 20 to depart from the departure point A, deliver the package at the delivery destination B, and return to the return point C.

For example, it suffices that the selection unit 105 acquires consumption amount information on the battery consumption amount based on at least the location information, and the selection unit 105 may acquire the consumption amount information without using the battery weight information. However, in this embodiment, there is described a case in which the selection unit 105 acquires the consumption amount information on the battery consumption amount for the unmanned aerial vehicle 20 to transport the package based on the battery weight information and the location information. The consumption amount information may be any information that enables the battery consumption amount to be identified, and may be, for example, a numerical value indicating the amount of power to be consumed, or a character indicating a rank of the amount of power to be consumed.

The function (calculation formula) for determining the consumption amount information may be stored as a mathematical expression in the data storage unit 100, or may be written as a part of a program code. For example, the function is defined so that the battery consumption amount becomes larger as the battery 30 becomes heavier, and becomes smaller as the battery 30 becomes lighter. For example, the function is determined so that the battery consumption amount becomes larger as the flight distance becomes longer, and becomes smaller as the flight distance becomes shorter.

In this embodiment, there is described a case in which the selection unit 105 selects the battery 30 further based on the package weight information in addition to the battery weight information and the location information. For this reason, the battery consumption amount indicated by the consumption amount information also influences the package weight information. For example, a function for calculating the consumption amount information is defined so that the battery consumption amount becomes larger as the package becomes heavier, and becomes smaller as the package becomes lighter.

For example, the selection unit 105 acquires a total flight distance of the unmanned aerial vehicle 20 based on the location information, and based on the battery weight information and the package weight information, acquires a standard flight distance per unit battery consumption amount (hereinafter referred to as fuel efficiency, and in this embodiment, the units are "m/KJ"). The selection unit 105 may then set a value obtained by dividing the total flight distance by the fuel efficiency as the battery consumption amount. The selection unit 105 may acquire the total flight distance by taking the sum value of the distances on the flight route.

FIG. 8 is a table for showing the fuel efficiency of the unmanned aerial vehicle 20. The total weight in FIG. 8 is the total weight excluding the weight of the body of the unmanned aerial vehicle 20. For example, when flying with a package loaded (outward flight in this embodiment), the total weight is the sum of the battery weight and the package weight, and when flying without a package loaded (return flight in this embodiment), the total weight is only the battery weight. As shown in FIG. 8, the fuel efficiency becomes worse as the total weight becomes heavier, and the fuel efficiency becomes better as the total weight becomes lighter. The degree of the fuel efficiency depends on whether or not the flight distance per unit battery consumption amount is long or short.

As described above, in this embodiment, the unmanned aerial vehicle 20 flies as illustrated in FIG. 2. Therefore, for example, the selection unit 105 acquires first consumption amount information on the battery consumption amount for flying from the departure point A to the delivery destination B in a state in which the package is loaded on the unmanned aerial vehicle 20. The first consumption amount information is the battery consumption amount for the outward flight. For the outward flight, not only the battery weight but also the package weight influences the battery consumption amount. For example, the selection unit 105 acquires fuel efficiency associated with the sum value of the battery weight and the package weight (total weight on outward flight), and acquires a value obtained by dividing the flight distance for the outward flight by the acquired fuel efficiency as the first consumption amount information.

Meanwhile, on the return flight, the package is not loaded on the unmanned aerial vehicle 20, and therefore the selection unit 105 acquires second consumption amount information on the battery consumption amount for flying from the delivery destination B to the return point C in a state in which the package is not loaded on the unmanned aerial vehicle 20. The second consumption amount information is the battery consumption amount for the return flight. For the return flight, the package has already been delivered, and hence the package weight does not influence the battery consumption amount. For example, the selection unit 105 acquires the fuel efficiency associated with the battery weight (total weight on return flight), and acquires a value obtained by dividing the total flight distance by the acquired fuel efficiency as the second consumption amount information.

The selection unit 105 selects the battery 30 based on the remaining charge information and the consumption amount information. In this embodiment, the selection unit 105 selects the battery 30 based on the remaining charge information, the first consumption amount information, and the second consumption amount information. For example, the selection unit 105 acquires the total consumption amount of energy based on the first consumption amount information and the second consumption amount information. The selection unit 105 may then select a battery 30 having a remaining charge equal to or more than the total consumption amount of energy, or may select a battery 30 having a little bit more energy as a margin, namely, a battery 30 having a remaining charge that is more than the total consumption amount of energy by a predetermined value.

The above-mentioned method of calculating the battery consumption amount is only an example, and another function may be used as the function for acquiring the battery consumption amount. For example, a function for calculating the battery consumption amount by taking a flight altitude into consideration may be used. In this case, as the flight altitude becomes higher, the wind becomes stronger and more energy is consumed to maintain the attitude, and as a result the battery consumption amount may be set higher. For example, as described in the modification examples later, when the temperature is low, not all of the energy of the battery 30 can be used, and hence the battery consumption amount may be calculated based on the assumption that the battery consumption amount increases for convenience. For example, when the standard battery consumption amount per unit distance (e.g., power consumption per 1 km) is used in place of fuel efficiency, there may be used a function for determining the battery consumption amount by multiplying the total flight distance of the unmanned aerial vehicle 20 by the standard battery consumption amount.

When there are a plurality of batteries 30 having a remaining charge for transporting the package, the selection unit 105 may select all or apart of those batteries. For example, the selection unit 105 may select the battery 30 having the lightest weight. Specifically, when there are a plurality of batteries 30 satisfying a selection condition, the selection unit 105 may identify the lightest battery 30 based on the battery weight information, and select that battery as the battery 30 to be installed in the unmanned aerial vehicle 20. When the selection unit 105 selects a plurality of batteries 30, the administrator may perform the final determination of the battery 30 to be installed in the unmanned aerial vehicle 20.

[3-7. Processing Execution Unit]

The processing execution unit 106 is mainly implemented by the control unit 11. The processing execution unit 106 executes processing for installing the battery 30 selected by the selection unit 105 in the unmanned aerial vehicle 20. In this embodiment, there is described as an example a case in which the processing is processing of outputting identification information on the battery 30 selected by the selection unit 105 and identification information on the package in association with each other. For example, the processing execution unit 106 displays on the display unit 15 the selection result screen G illustrated in FIG. 4.

The identification information on the battery 30 may be the battery ID or the battery name. The identification information on the package may be the package ID, the order ID, or the location information on the delivery destination. The term "output" means, for example, display of an image, data output, or printing. For example, displaying a correspondence between the battery 30 and the package in an identifiable manner on an image or on a sheet of paper, or linking the identification information on the battery 30 and the identification information on the package to each other in terms of data in a searchable manner corresponds to the outputting the two pieces of identification information in association with each other.

4. Processing to be Performed in Battery Installation System

Figure 9:
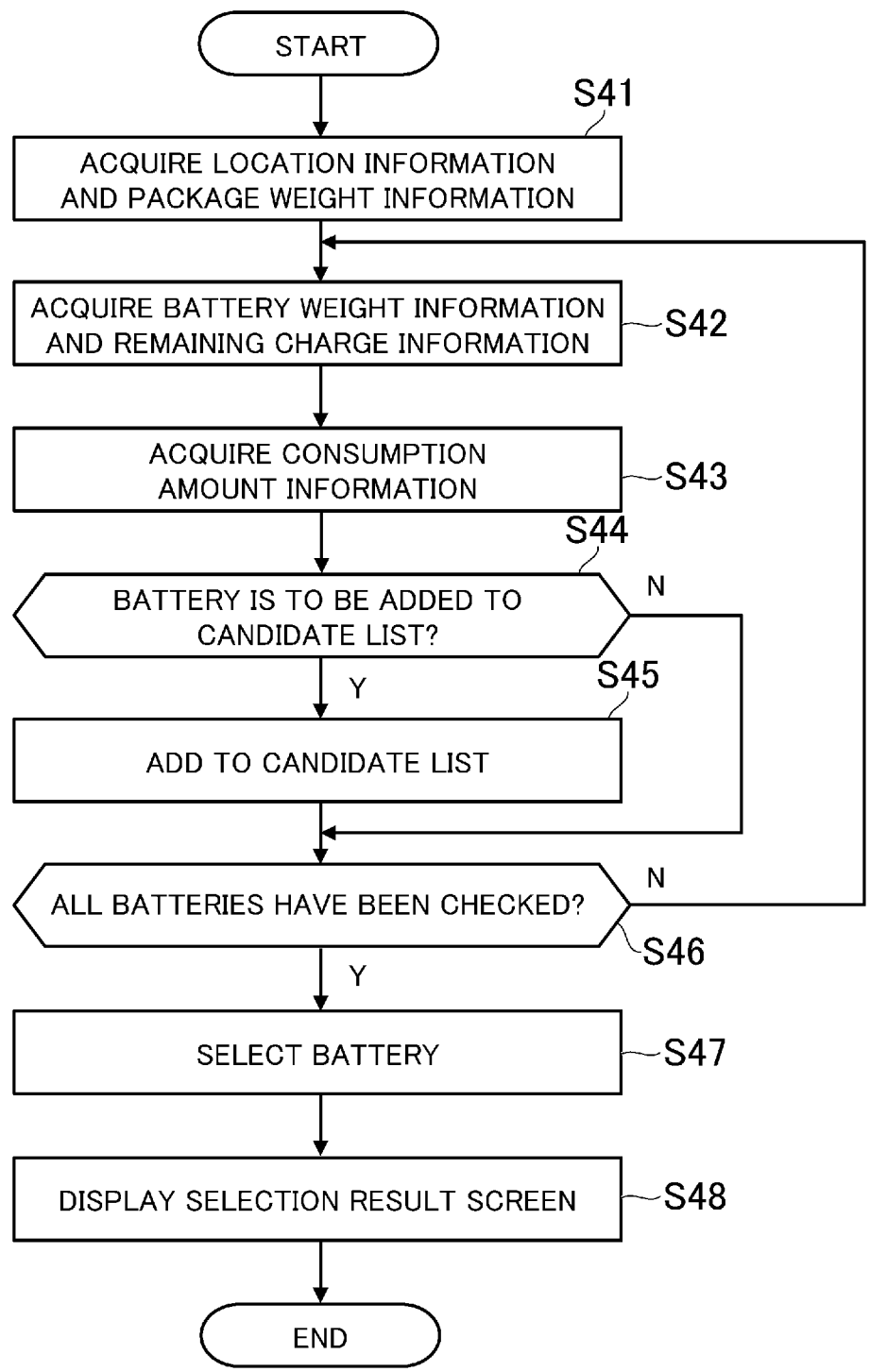
FIG. 9 is a flowchart for illustrating an example of processing to be executed in the battery installation system.

FIG. 9 is a flowchart for illustrating an example of the processing to be executed in the battery installation system 1. The processing illustrated in FIG. 9 is executed by the control unit 11 operating in accordance with programs stored in the storage unit 12. In this embodiment, the functional blocks illustrated in FIG. 5 are implemented by execution of the processing described below. The processing of FIG. 9 is the detailed processing of Step S4 illustrated in FIG. 3.

As illustrated in FIG. 9, first, the control unit 11 refers to the delivery data stored in the storage unit 12 to acquire the location information and the package weight information corresponding to the package to be delivered (Step S41). The package ID of the package to be delivered may be input by the administrator from the operation unit 14, or may be acquired by including the package ID in code information attached to a label of the package and reading the code information by a code reader. For example, the control unit 11 may select any package from among undelivered packages. In Step S41, the control unit 11 acquires the location information and the package weight information from the record in which, among the delivery data, the package ID of the package to be delivered is stored.

The control unit 11 refers to the battery data stored in the storage unit 12 to acquire the battery weight information and the remaining charge information on the usable batteries 30 (Step S42). In Step S42, the control unit 11 identifies a record in which the present state stored in the battery data indicates "charging", and acquires the battery weight information and the remaining charge information stored in the record. The processing from Step S42 to Step S45 is executed for each "charging" battery 30.

The control unit 11 acquires consumption amount information based on the package weight information, the battery weight information, and the location information (Step S43). In Step S43, the control unit 11 calculates a flight route based on the location information, and acquires the flight distance of the outward flight and the flight distance of the return flight on the flight route. The information on the locations of the departure point A and the return point C is assumed to be stored in the storage unit 12 in advance. The control unit 11 acquires the first consumption amount information by dividing the flight distance of the outward flight by the fuel efficiency (fuel efficiency of outward flight) corresponding to the sum value of the package weight and the battery weight. The control unit 11 also acquires the second consumption amount information by dividing the flight distance of the return flight by the fuel efficiency (fuel efficiency of return flight) corresponding to the battery weight.

The control unit 11 determines, based on the remaining charge information and the consumption amount information, whether or not a determination target battery 30 is to be added to a candidate list (Step S44). The candidate list is a list in which candidates for the battery 30 to be installed in the unmanned aerial vehicle 20 are stored. In Step S44, the control unit 11 acquires the total consumption amount of energy based on the first consumption amount information and the second consumption amount information, and when the determination target battery 30 has a remaining charge equal or more than the total consumption amount, determines that the determination target battery 30 is to be added to the candidate list.

When it is determined that the determination target battery is to be added to the candidate list (Step S44: Y), the control unit 11 adds the battery ID of the determination target battery to the candidate list (Step S45). When it is determined that the determination target battery is not to be added to the candidate list (Step S44: N), the processing of Step S45 is not executed. The control unit 11 then determines, based on the battery data, whether or not all usable batteries 30 have been checked (Step S46). When there is a battery 30 that has not been checked yet (Step S46: N), the processing returns to Step S42, and determination processing for the next determination target battery 30 is performed.

Meanwhile, when all the batteries 30 have been checked (Step S46: Y), the control unit 11 selects the battery 30 having the lightest battery weight from the candidate list based on the battery data (Step S47). When there is only one battery 30 in the candidate list, the processing of Step S47 may be omitted. When there are no batteries in the candidate list, an error message may be displayed.

The control unit 11 displays on the display unit 15 the selection result screen G based on the selection result of Step S47 (Step S48), and the processing ends. In Step S48, the control unit 11 acquires, based on the battery data and the delivery data, the battery ID, the battery name, and the like of the battery 30 selected in Step S47, and displays the selection result screen G by associating the acquired information with the package ID and the like of the package to be delivered. The administrator then installs the battery 30 in the unmanned aerial vehicle 20 as described with reference to FIG. 3.

In the battery installation system 1 described above, a battery 30 having a sufficient remaining charge is selected in consideration of the battery weight information, and therefore it is possible to prevent the installation of a battery 30 having an unnecessarily large capacity while increasing the certainty of completing the delivery. As a result, wasteful energy consumption can be prevented. Specifically, it is possible to reduce the amount of energy consumed in the delivery of the package and to achieve power saving for delivery.

The battery installation system 1 selects the battery 30 in consideration of package weight information, which enables the optimal battery 30 to be selected for the weight of the package. Therefore, the certainty of completing the delivery of the package can be further increased.

The battery installation system 1 can also minimize the battery consumption amount by selecting the lightest battery when there are a plurality of batteries having a remaining charge for transporting the package, which enables power saving during delivery to be achieved more effectively.

The battery installation system 1 selects the battery 30 by acquiring consumption amount information, which enables a battery 30 having a sufficient remaining charge to be selected more accurately. Therefore, the certainty of completing the delivery of the package can be further increased.

The battery installation system 1 outputs the identification information on the selected battery 30 and the identification information on the package in association with each other. Therefore, the administrator can easily grasp which battery 30 is to be installed in order to deliver which package. As a result, erroneous installation of the battery 30 can be prevented.

The battery installation system 1 can select the optimal battery 30 that prevents wasteful energy consumption when the unmanned aerial vehicle 20 loads the package at the departure point A, flies to the delivery destination B to deliver the package, and then returns to the return point C.

5. Modification Examples

The present invention is not limited to the embodiment described above, and can be modified suitably without departing from the spirit of the present invention.

Figure 10:
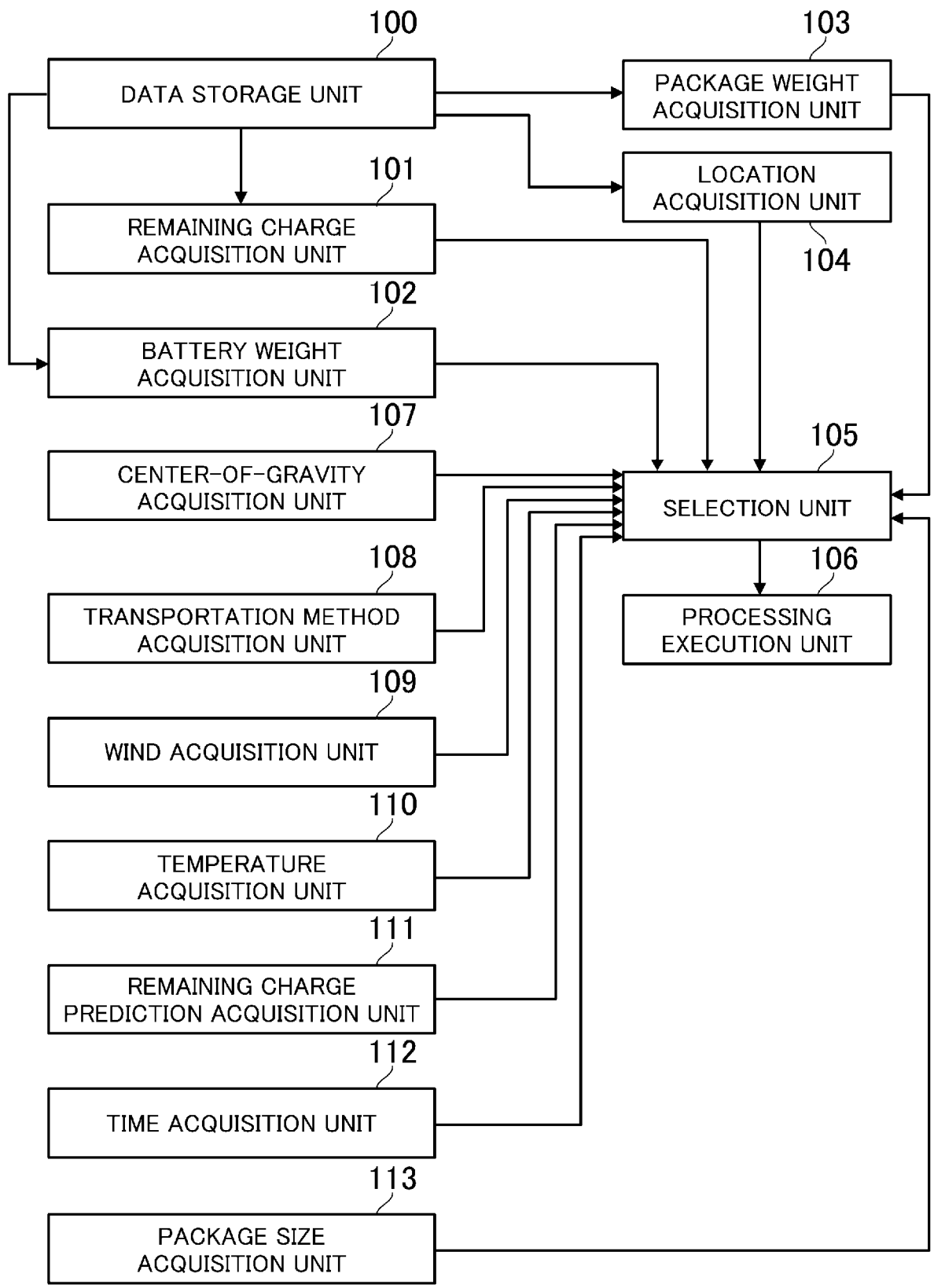
FIG. 10 is a functional block diagram of a modification example.

FIG. 10 is a functional block diagram of a modification example. As illustrated in FIG. 10, in the modification examples described below, in addition to the functions of the embodiment, a center-of-gravity acquisition unit 107, a transportation method acquisition unit 108, a wind acquisition unit 109, a temperature acquisition unit 110, a remaining charge prediction acquisition unit 111, a time acquisition unit 112, and a package size acquisition unit 113 are implemented. There are now described cases in which each of those functions is implemented by the delivery management device 10.

Modification Example (1)

For example, when a position of a center of gravity during flight exhibited at the time of being loaded with a package changes, a turning performance and an output balance of the motor change, which can cause the fuel efficiency of the unmanned aerial vehicle 20 to change. For example, when the center of gravity is near the center (center of unmanned aerial vehicle 20 or package), the aircraft is stable and the control for maintaining the attitude is simple, which can result in improved fuel efficiency. However, as the center of gravity becomes farther from the center, the aircraft becomes unstable, and the control for maintaining the attitude becomes more complicated, and may affect the fuel efficiency. Therefore, in such a case, the battery 30 may be selected in consideration of the center of gravity as well.

The battery installation system 1 according to Modification Example (1) includes the center-of-gravity acquisition unit 107. The center-of-gravity acquisition unit 107 is mainly implemented by the control unit 11. The center-of-gravity acquisition unit 107 is configured to acquire center-of-gravity information on the center of gravity exhibited when a package is loaded on the unmanned aerial vehicle 20. The center-of-gravity information may be two-dimensional information indicating the center of gravity on a geometrical plane, or may be three-dimensional information that takes into account the center of gravity in the vertical direction as well. As a center-of-gravity measuring method itself, any one of various methods may be used. For example, a pressure distribution sensor may be used, or a method of identifying the center of gravity by suspending an object from a thread or a wire may be used. The center-of-gravity information may indicate the center of gravity of only the package, or may indicate the center of gravity of the entire unmanned aerial vehicle 20 loaded with the package.

For example, the center-of-gravity information may be measured for each package and stored in advance in the delivery data. In this case, the center-of-gravity acquisition unit 107 acquires the center-of-gravity information by referring to the delivery data. For example, the center-of-gravity acquisition unit 107 may acquire the center-of-gravity information from a sensor for measuring the center of gravity, or may acquire the center-of-gravity information based on input received from an administrator who has confirmed the center of gravity.

In Modification Example (1), the selection unit 105 selects the battery 30 further based on the center-of-gravity information in addition to the remaining charge information, the battery weight information, and the location information. For example, the selection unit 105 acquires the consumption amount information based on the center-of-gravity information. In this case, the function for calculating the consumption amount information may be defined so that the battery consumption amount becomes smaller as the center of gravity becomes closer to the center and becomes larger as the center of gravity becomes farther from the center. For example, the selection unit 105 acquires the fuel efficiency corresponding to the distance between the center of gravity and the center, and acquires the consumption amount information based on the fuel efficiency. The position of the center may be stored in advance in the data storage unit 100. When the center-of-gravity information is two-dimensional information, the center is also represented as two-dimensional information, and when the center-of-gravity information is three-dimensional information, the center is also represented as three-dimensional information.

FIG. 11 is a table for showing a relationship between the fuel efficiency and the distance between the center of gravity and the center. The relationship shown in FIG. 11 may be stored in the data storage unit 100 in the form of a mathematical expression or a table, or may be written as part of a program code. As shown in FIG. 11, the fuel efficiency improves as the distance between the center of gravity and the center decreases, and the fuel efficiency deteriorates as the distance between the center of gravity and the center increases. The selection unit 105 acquires the consumption amount information based on the fuel efficiency corresponding to the distance between the center of gravity and the center. In this case, because a fuel efficiency coefficient is shown, the selection unit 105 corrects the fuel efficiency by multiplying the fuel efficiency acquired by the method described in the embodiment by the coefficient in FIG. 11. The selection unit 105 then acquires consumption amount information based on the corrected fuel efficiency. The method of calculating the consumption amount information is as described in the embodiment.

In Modification Example (1), the battery 30 is selected in consideration of the center-of-gravity information, which enables the certainty of completing the delivery to be increased more effectively, and can prevent wasteful energy consumption more effectively. Specifically, power saving during delivery can be achieved more effectively.

Modification Example (2)

For example, the transportation method may change depending on the contents of the package. For example, for a package that has weak resistance to vibrations, such as tableware, it is required for such a package to be transported at a low speed and a low acceleration, for which the fuel efficiency is not particularly good, in order to reduce vibrations during transportation. For a package that has strong resistance to vibrations, such as a book, the package may be transported at a speed having the best fuel efficiency without particularly considering vibrations during transportation. In this way, the battery consumption amount changes depending on the transportation method of the package, and therefore the battery 30 may be selected in consideration of the transportation method of the package as well.

The battery installation system 1 according to Modification Example (2) includes the transportation method acquisition unit 108. The transportation method acquisition unit 108 is mainly implemented by the control unit 11. The transportation method acquisition unit 108 is configured to acquire transportation method information on the transportation method of the package. The transportation method may be any information that enables the transportation method of the package to be identified, and is, for example, a flight speed, an acceleration, a flight altitude, or an allowable vibration amount.

For example, the transportation method information may be stored in the delivery data in advance. In this case, the transportation method acquisition unit 108 acquires the transportation method information by referring to the delivery data. When the transportation method information is not particularly stored in the delivery data, the transportation method acquisition unit 108 may acquire transportation method information input by the administrator from the operation unit 14, or with data associating the contents of the package with the transportation method being stored in advance in the data storage unit 100, identify the transportation method corresponding to the contents of the package indicated by the delivery data.

In Modification Example (2), the selection unit 105 selects the battery further based on the transportation method information in addition to the remaining charge information, the battery weight information, and the location information. For example, the selection unit 105 acquires the consumption amount information based on the transportation method information. In this case, the function for calculating the consumption amount information may be defined so that the battery consumption amount is smaller for transportation methods having better fuel efficiency and larger for transportation methods having worse fuel efficiency. For example, the selection unit 105 acquires the fuel efficiency corresponding to the transportation method information, and acquires the consumption amount information based on the fuel efficiency.

Examples of transportation method information having good fuel efficiency include information indicating that a difference between a reference speed at which the fuel efficiency is optimal and the flight speed is small, information indicating that the acceleration is not extremely low or not extremely high, information indicating that the flight altitude is low, and information indicating that there is a large amount of allowable vibrations. The reference speed may be, for example, a speed specified by the manufacturer of the unmanned aerial vehicle 20, or a speed calculated based on actual measurements obtained by the administrator.

FIG. 12 is a table for showing a relationship between the transportation method information and the fuel efficiency. The relationship shown in FIG. 12 may be stored in the data storage unit 100 in the form of a mathematical expression or a table, or may be written as part of a program code. As shown in FIG. 12, for example, as the difference between the reference speed and the flight speed becomes smaller, the fuel efficiency becomes better, and as the difference becomes larger, the fuel efficiency becomes worse. For example, as the flight altitude becomes lower, the fuel efficiency becomes better, and as the flight altitude becomes higher, the fuel efficiency becomes worse. For example, as the amount of allowable vibrations becomes larger, the fuel efficiency becomes better, and as the amount of allowable vibrations becomes smaller, the fuel efficiency becomes worse. Similarly to Modification Example (1), because a fuel efficiency coefficient is shown in FIG. 12, the selection unit 105 corrects the fuel efficiency by multiplying the fuel efficiency acquired by the method described in the embodiment by the coefficient in FIG. 12. The selection unit 105 then acquires consumption amount information based on the corrected fuel efficiency. The method of calculating the consumption amount information is as described in the embodiment.

In Modification Example (2), the battery 30 is selected in consideration of the transportation method information, which enables the certainty of completing the delivery to be increased more effectively, and can prevent wasteful energy consumption more effectively. Specifically, power saving during delivery can be achieved more effectively.

Modification Example (3)

For example, the battery consumption amount may change depending on the wind near the flight route. Therefore, the battery 30 may be selected in consideration of the wind on the flight route as well. It is not required to consider all of the winds on the flight route, and it may be enough to consider the winds of only a partial area.

The battery installation system 1 according to Modification Example (3) includes the wind acquisition unit 109. The wind acquisition unit 109 is mainly implemented by the control unit 11. The wind acquisition unit 109 is configured to acquire wind information on the wind on the flight route of the unmanned aerial vehicle 20. The wind information may be any information that indicates at least one of a wind speed or a wind direction, and may indicate both of those or only one of them. The wind on the flight route is the wind on or near the flight route (within area of several meters to several tens of kilometers from flight route).

For example, when the sensor unit 24 of the unmanned aerial vehicle 20 includes a wind sensor, the wind acquisition unit 109 may acquire wind information detected by the wind sensor. For example, the wind acquisition unit 109 may acquire wind information detected by an anemometer on the ground or wind information distributed by a server of the Meteorological Agency through a network, or may acquire wind information detected by an unmanned aerial vehicle other than the unmanned aerial vehicle 20 responsible for the delivery of the package. The wind acquisition unit 109 may also acquire wind information based on input received from the administrator, for example.

In Modification Example (3), the selection unit 105 selects the battery further based on the wind information in addition to the remaining charge information, the battery weight information, and the location information. For example, the selection unit 105 acquires the consumption amount information based on the wind information. In this case, the function for calculating the consumption amount information may be defined so that, for example, the battery consumption amount becomes smaller as a tailwind becomes stronger, and becomes larger as a headwind becomes stronger. For example, the selection unit 105 acquires the fuel efficiency corresponding to the wind information, and acquires the consumption amount information based on the fuel efficiency. The wind may be considered as blowing at the same strength and in the same direction for all areas on the flight route, or when the wind information can be acquired from each of a plurality of points on the flight route, consideration may be given to the wind for each measurement point.

FIG. 13 is a table for showing a relationship between the wind information and the fuel efficiency. The relationship shown in FIG. 13 may be stored in the data storage unit 100 in the form of a mathematical expression or a table, or may be written as part of a program code. As shown in FIG. 13, the fuel efficiency improves as a tailwind becomes stronger, and the fuel efficiency deteriorates as a headwind or a crosswind becomes stronger. The selection unit 105 acquires the consumption amount information based on the fuel efficiency corresponding to the wind information. In this case, because a fuel efficiency coefficient is shown in FIG. 13 similarly to Modification Examples (1) and (2), the selection unit 105 corrects the fuel efficiency by multiplying the fuel efficiency acquired by the method described in the embodiment by the coefficient in FIG. 13. The selection unit 105 then acquires consumption amount information based on the corrected fuel efficiency. The method of calculating the consumption amount information is as described in the embodiment.

In Modification Example (3), the battery 30 is selected in consideration of the wind information, which enables the certainty of completing the delivery to be increased more effectively, and can prevent wasteful energy consumption more effectively. Specifically, power saving during delivery can be achieved more effectively.

Modification Example (4)

For example, the discharge characteristics of the battery 30 may differ depending on the temperature under the usage environment. For example, in a general discharge temperature characteristic curve, the battery 30 lasts for longer as the temperature becomes higher, and lasts for shorter as the temperature becomes lower. Therefore, the battery 30 may be selected in consideration of the temperature on the flight route as well. It is not required to consider all of the temperatures on the flight route, and it is enough to consider the temperatures of only a partial area.

The battery installation system 1 according to Modification Example (4) includes the temperature acquisition unit 110. The temperature acquisition unit 110 is mainly implemented by the control unit 11. The temperature acquisition unit 110 is configured to acquire temperature information on the temperature on the flight route of the unmanned aerial vehicle 20. The temperature information is a numerical value indicating the temperature in the atmosphere, and may be expressed, for example, in units of Celsius or Fahrenheit. The temperature on the flight route may be the temperature on or near the flight route (may be temperature within area of several meters to several tens of kilometers from flight route, or may be temperature by altitude).

For example, when the sensor unit 24 of the unmanned aerial vehicle 20 includes a temperature sensor, the temperature acquisition unit 109 may acquire temperature information detected by the temperature sensor. For example, the wind acquisition unit 109 may acquire temperature information detected by a thermometer on the ground or temperature information distributed by a server of the Meteorological Agency or the like through a network, or may acquire temperature information detected by an unmanned aerial vehicle other than the unmanned aerial vehicle 20 responsible for the delivery of the package. The temperature acquisition unit 110 may also acquire temperature information based on input received from the administrator, for example.

In Modification Example (4), the selection unit 105 selects the battery 30 further based on temperature information in addition to the remaining charge information, the battery weight information, and the location information. For example, the selection unit 105 corrects the remaining charge information based on a discharge characteristic curve.

FIG. 14 is a table for showing a relationship between the temperature information and the actual remaining charge.

The relationship shown in FIG. 14 may be stored as a discharge temperature characteristic curve in the data storage unit 100 in the form of a mathematical expression or a table, or written as part of a program code. As shown in FIG. 14, the actual remaining charge may be determined to become larger as the temperature becomes higher, and smaller as the temperature becomes lower. In this case, because a remaining charge information correction coefficient is shown, the selection unit 105 corrects the remaining charge information by multiplying the remaining charge information by the coefficient in FIG. 14. The selection unit 105 then selects the battery 30 by comparing the corrected remaining charge information and the consumption amount information.

In Modification Example (4), the battery 30 is selected in consideration of the temperature information, which enables the certainty of completing the delivery to be increased more effectively, and can prevent wasteful energy consumption more effectively. Specifically, power saving during delivery can be achieved more effectively.

Modification Example (5)

For example, when there is some time until the battery 30 is to be installed in the unmanned aerial vehicle 20, batteries 30 being charged are charged to increase the remaining charge. Therefore, the battery 30 may be selected after predicting a future remaining charge.

The battery installation system 1 according to Modification Example (5) includes the remaining charge prediction acquisition unit 111. The remaining charge prediction acquisition unit 111 is mainly implemented by the control unit 11. The remaining charge prediction acquisition unit 111 is configured to acquire remaining charge prediction information on a remaining charge prediction of the batteries 30 being charged. The term battery 30 being charged refers to a battery 30 that has a state of charge of less than 100% and is connected to the charger 40. The remaining charge prediction information may be any information that indicates a predicted value of the remaining charge in the future. The future may be any point in time after the remaining charge prediction acquisition unit 111 executes processing, for example, the date and time at which the battery 30 is expected to be installed in the unmanned aerial vehicle 20.

For example, a function for calculating the remaining charge prediction information may be defined in advance, and the remaining charge prediction acquisition unit 111 may acquire the remaining charge prediction information based on the present remaining charge information and the function. The function may be defined so that the amount of increase in the remaining charge becomes larger as the future point in time serving as a reference for determining the remaining charge prediction information becomes farther from the current point in time, and the amount of increase in the remaining charge becomes smaller as the future point in time becomes closer to the current point in time. For example, an amount of increase in the remaining charge per unit time period may be defined in the function, and the remaining charge prediction acquisition unit 111 may acquire the amount of increase in the remaining charge by multiplying the amount of increase in the remaining charge per unit time period by a time period from the current point in time until the future point in time. The future point in time may be determined based on input received from the administrator, or may be a point in time that is a predetermined time period after the current point in time, or may be the delivery time specified in the package, as is the case in Modification Example (6), which is described later.

In Modification Example (5), the selection unit 105 selects the battery 30 further based on the remaining charge prediction information in addition to the remaining charge information, the battery weight information, and the location information. For example, the selection unit 105 selects a battery 30 having a battery consumption amount indicated by the consumption amount information that is equal to or more than the remaining charge indicated by the remaining charge prediction information. In the case of a battery 30 having 100% as the state of charge indicated by the remaining charge information, because the charge amount does not increase any more, the selecting unit 105 may select the battery 30 based on the remaining charge information in place of the remaining charge prediction information.

In Modification Example (5), the battery 30 is selected in consideration of the remaining charge prediction information, and therefore, even when the present charge amount has not reached the battery consumption amount, it is possible to select a battery 30 that is to reach the battery consumption amount by the time of departure of the unmanned aerial vehicle 20, which enables the range of usable batteries 30 to be widened. As a result, a battery 30 consuming less energy can be selected, and power saving for delivery can be achieved more effectively.

Modification Example (6)

For example, a time point serving as a reference for the remaining charge prediction information described in Modification Example (5) may be a time specified for the movement destination of the unmanned aerial vehicle 20. This time can also be referred to as the time at which the unmanned aerial vehicle 20 provides a predetermined service (e.g., package delivery service or collection service). In this example, the unmanned aerial vehicle 20 delivers a package, and therefore the time point may be the time at which the package is to arrive at the delivery destination B (arrival time at delivery destination B), the time at which the package is to depart from the departure point A (departure time from departure point A), or a time between the arrival time and the departure time.

The battery installation system 1 according to Modification Example (6) includes the time acquisition unit 112. The time acquisition unit 112 is mainly implemented by the control unit 11. The time acquisition unit 112 is configured to acquire time information on a time specified for the movement destination. The time information may include both a date and the time, or may be information on only the time. The time information may be stored in advance in the delivery data. In this example, there is described a case in which the unmanned aerial vehicle 20 delivers a package, and therefore the time indicated by the time information can be referred to as the delivery time specified for the package. For example, the time acquisition unit 112 acquires time information by referring to the delivery data. As another example, the time acquisition unit 112 may acquire the time information based on input received from the administrator or based on input received from the recipient.

The remaining charge prediction acquisition unit 111 according to Modification Example (6) acquires the remaining charge prediction information based on the time information. Specifically, the time indicated by the time information is set as a future point in time to serve as a reference for the remaining charge prediction information. The method of acquiring the remaining charge prediction information is as described in Modification Example (5).

In Modification Example (6), the remaining charge prediction information is acquired in consideration of time information, which enables the accuracy of the remaining charge prediction information to be increased. As a result, even when the present charge amount has not reached the battery consumption amount, it is possible to select a battery 30 that is to reach the battery consumption amount by the time of the departure of the unmanned aerial vehicle 20, which enables the range of usable batteries 30 to be more effectively widened. As a result, a battery 30 consuming less energy can be selected, and power saving for delivery can be achieved more effectively.

Modification Example (7)

For example, air resistance becomes larger as the package size becomes larger, and the influence of the wind tends to increase. Therefore, the battery 30 may be selected in consideration of the package size as well.

The battery installation system 1 according to Modification Example (7) includes the package size acquisition unit 113. The package size acquisition unit 113 is mainly implemented by the control unit 11. The package size acquisition unit 113 is configured to acquire package size information on the package size. The package size information may be any information that enables the package size to be identified, and may indicate, for example, the sum value of the length, width, and height of the package, the surface area of the largest flat area, or the volume of the package.

For example, the size information may be measured for each package and stored in advance in the delivery data. In this case, the package size acquisition unit 113 acquires the package size information by referring to the delivery data. For example, the package size acquisition unit 113 may acquire the package size information by performing image analysis on a photograph of the package, or based on input received from an administrator who has confirmed the package.

In Modification Example (7), the selection unit 105 selects the battery 30 further based on the package size information in addition to the remaining charge information, the battery weight information, and the location information. For example, the selection unit 105 acquires the consumption amount information based on the package size information. In this case, the function for calculating the consumption amount information may be defined so that the battery consumption amount becomes smaller as the package size becomes smaller, and becomes larger as the package size becomes larger.

For example, the relationship between the package size and the fuel efficiency may be stored in the data storage unit 100 in the form of a mathematical expression or a table, or may be written as a part of a program code. For example, the fuel efficiency becomes better as the package size becomes smaller, and the fuel efficiency becomes worse as the package size becomes larger. The selection unit 105 acquires the consumption amount information based on the fuel efficiency corresponding to the package size. For example, the selection unit 105 corrects the fuel efficiency by multiplying the fuel efficiency acquired by the method described in the embodiment by a coefficient corresponding to the package size. The selection unit 105 acquires the consumption amount information based on the corrected fuel efficiency. The method of calculating the consumption amount information is as described in the embodiment.

In Modification Example (7), the battery 30 is selected in consideration of the package size information, which enables the certainty of completing the delivery to be increased more effectively, and can prevent wasteful energy consumption more effectively. Specifically, power saving during delivery can be achieved more effectively.

Modification Example (8)

For example, in the embodiment, there is described as an example a case in which the unmanned aerial vehicle 20 delivers a package, but the optimal battery 30 may also be selected based on the same processing as in the embodiment even for a case in which the unmanned aerial vehicle 20 collects a package. Specifically, the location information may be any information on at least one of the delivery destination or the collection destination of the package to be transported by the unmanned aerial vehicle 20. In Modification Example (8), the location information is information on the collection destination of the package. Similarly to the delivery destination, the collection destination may be indicated by the address or by the latitude and longitude.

Figure 15:
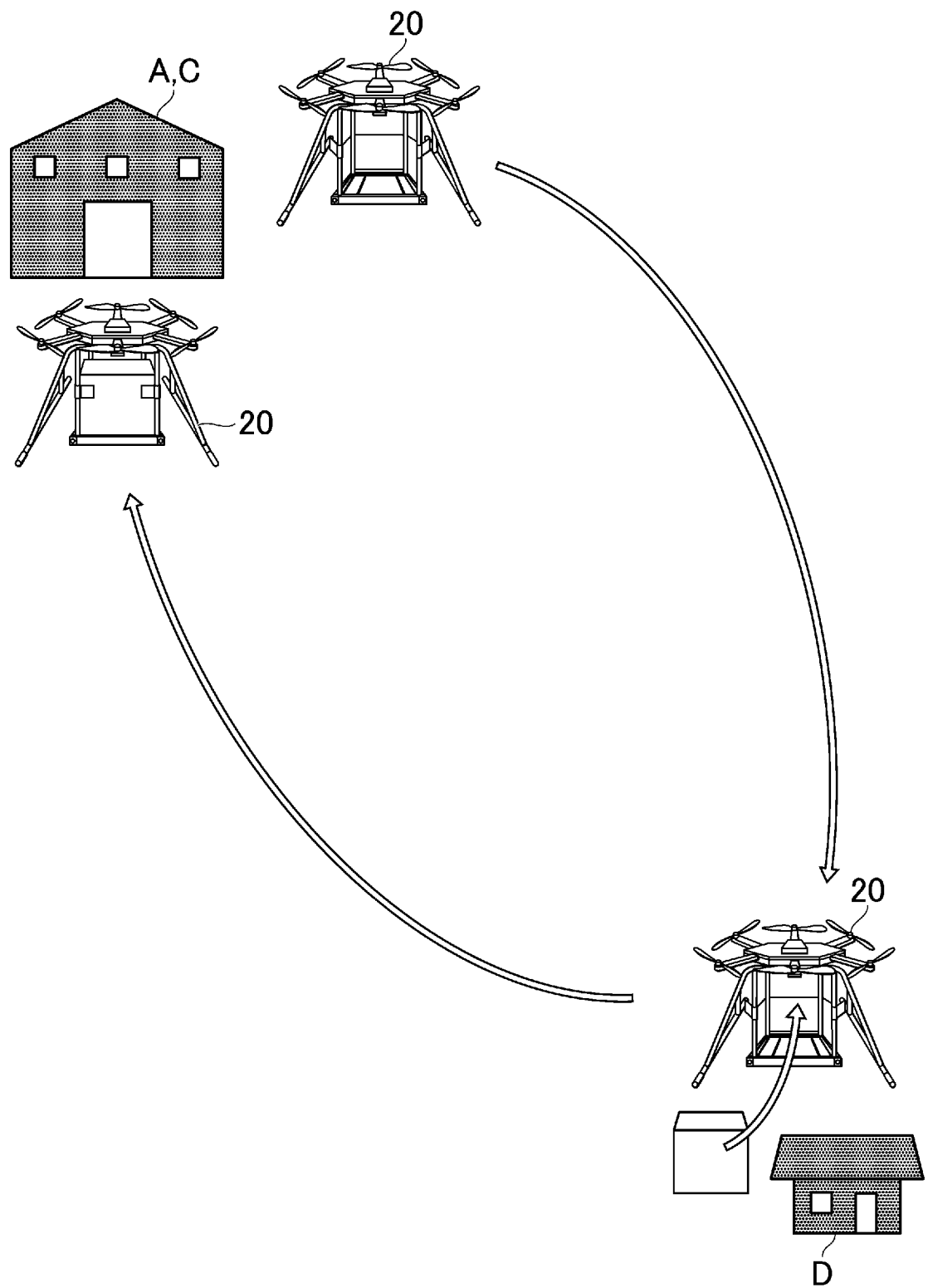
FIG. 15 is a diagram for illustrating how the unmanned aerial vehicle collects a package.

FIG. 15 is a diagram for illustrating how the unmanned aerial vehicle 20 collects a package. As illustrated in FIG. 15, in Modification Example (8), as a transportation method, the unmanned aerial vehicle 20 flies from the departure point A to a collection destination D to collect a package, and then returns to the return point C. In this case, unlike a case in which a package is delivered as in the embodiment, the package is not loaded on the unmanned aerial vehicle 20 on the outward flight, and the package is loaded on the unmanned aerial vehicle 20 on the return flight. In the case of collection, each piece of information to be stored in the delivery data may be input in advance by the administrator or a party requesting collection.

For example, when the party requesting collection confirms that the unmanned aerial vehicle 20 has arrived and landed at the collection destination D, the party requesting collection fixes the package to be collected to the catcher. Then, when a predetermined operation is performed at a terminal (e.g., personal computer or smartphone) of the party requesting collection, the unmanned aerial vehicle 20 starts its return to the return point C. The return instruction may be input from, in place of the terminal of the party requesting collection, an operation unit such as a button arranged on the unmanned aerial vehicle 20, or the return instruction may be issued when the sensor unit 24 detects a predetermined sound or a predetermined image. The unmanned aerial vehicle 20 may also automatically start its return when a predetermined time has elapsed after landing.

The selection unit 105 acquires third consumption amount information on the battery consumption amount for flying from the departure point A to the collection destination D in a state in which the package is not loaded on the unmanned aerial vehicle 20. The third consumption amount information is the battery consumption amount for the outward flight. For the outward flight, the package weight does not influence the battery consumption amount because the package has not yet been collected. For example, the selection unit 105 acquires the fuel efficiency associated with the battery weight, and acquires a value obtained by dividing the total flight distance by the acquired fuel efficiency as the third consumption amount information.

Further, the selection unit 105 acquires fourth consumption amount information on the battery consumption amount for flying from the collection destination D to the return point C in a state in which the package is loaded on the unmanned aerial vehicle 20. The fourth consumption amount information is the battery consumption amount for the return flight. For the return flight, the package has been collected, and therefore not only the battery weight but also the package weight influences the battery consumption amount. For example, the selection unit 105 acquires the fuel efficiency associated with the sum value of the battery weight and the package weight, and acquires a value obtained by dividing the total flight distance by the acquired fuel efficiency as the fourth consumption amount information.

The selection unit 105 selects the battery 30 based on the remaining charge information, the third consumption amount information, and the fourth consumption amount information. The selection unit 105 may select a battery 30 having a remaining charge equal to or more than the battery consumption amount, or may select a battery 30 having a little bit more energy as a margin, namely, a battery 30 having a remaining charge that is more than the battery consumption amount of energy by a predetermined value.

In Modification Example (8), it is possible to select the optimal battery 30 that prevents wasteful energy consumption when the unmanned aerial vehicle 20 flies from the departure point A to the collection destination D to collect the package, and then returns to the return point C.

In the case of combining Modification Example (8) with Modification Example (6), the time information is information on the collection time specified for the package. Similarly to the delivery time, the collection time may be the time at which the package is to arrive at the collection destination D, the time at which the unmanned aerial vehicle 20 is to depart from the departure point A in order to arrive at the collection destination D, or a time between the arrival time and the departure time.

Modification Example (9)

For example, the optimal battery 30 may be selected based on the same processing as in the embodiment even for a package transportation method in which the unmanned aerial vehicle 20 performs both collection and delivery of the package during a period after leaving the departure point A until returning to the return point C.

Figure 16:
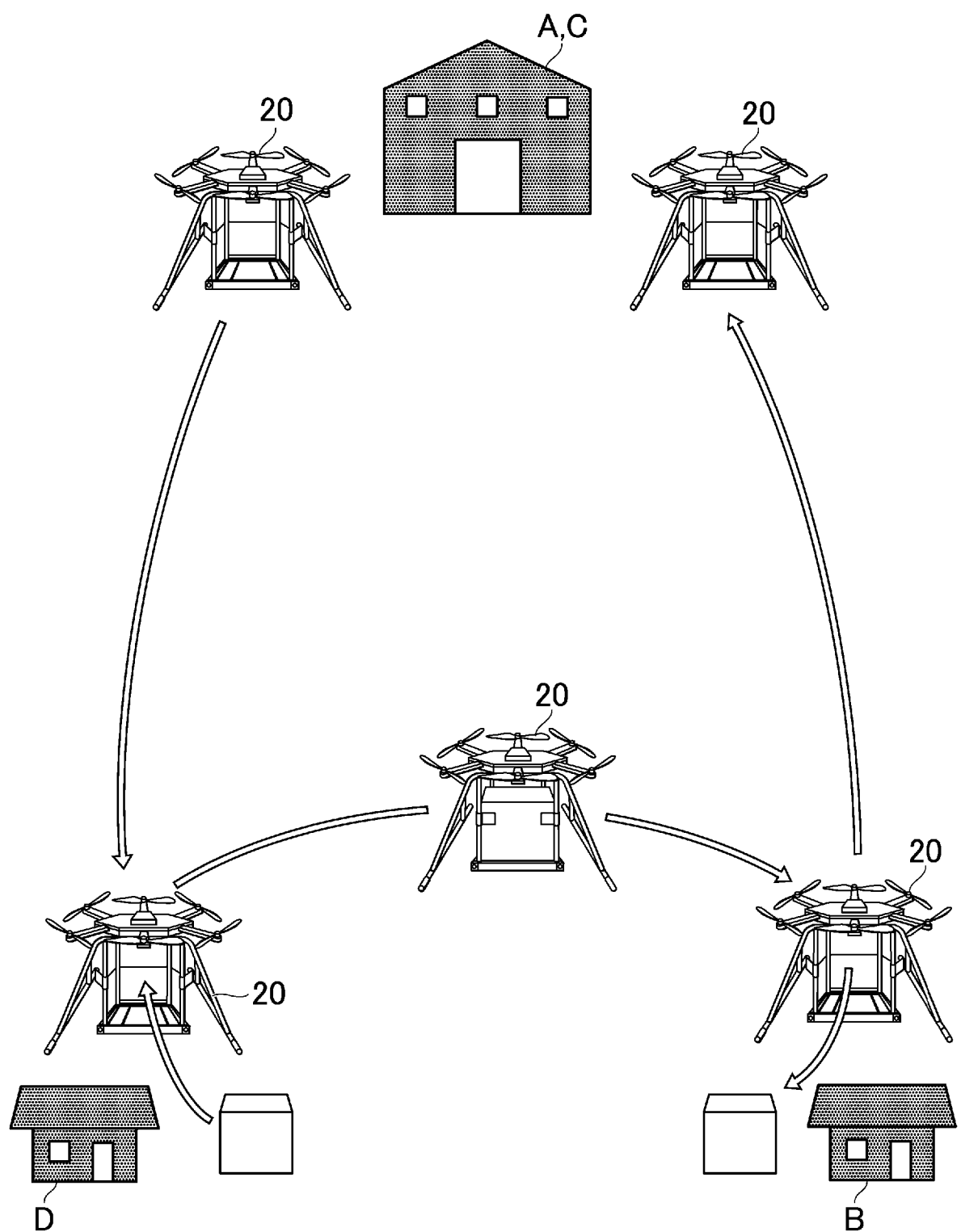
FIG. 16 is a diagram for illustrating how the unmanned aerial vehicle collects and delivers a package.

FIG. 16 a diagram for illustrating how the unmanned aerial vehicle 20 collects and delivers a package. As illustrated in FIG. 16, in Modification Example (9), the unmanned aerial vehicle 20 flies from the departure point A to the collection destination D to collect the package, flies to the delivery destination B to deliver the package, and then returns to the return point C. In this case, during the flight from the departure point A to the collection destination D and the flight from the delivery destination B to the return point C, the package is not loaded on the unmanned aerial vehicle 20, but during the flight from the collection destination D to the delivery destination B, the package is loaded on the unmanned aerial vehicle 20.

The selection unit 105 acquires fifth consumption amount information on the battery consumption amount for flying from the departure point A to the collection destination D in a state in which the package is not loaded on the unmanned aerial vehicle 20. The fifth consumption amount information is the battery consumption amount for a first route from the departure point A to the collection destination D. For the first route, the package weight does not influence the battery consumption amount because the package has not yet been collected. For example, the selection unit 105 acquires the fuel efficiency associated with the battery weight, and acquires a value obtained by dividing the total flight distance by the acquired fuel efficiency as the fifth consumption amount information.

The selection unit 105 acquires sixth consumption amount information on the battery consumption amount for flying from the collection destination D to the delivery destination B in a state in which the package is loaded on the unmanned aerial vehicle 20. The sixth consumption amount information is the battery consumption amount for a second route from the collection destination D to the delivery destination B. For the second route, the package has been collected, and hence in addition to the battery weight, the package weight also influences the battery consumption amount. For example, the selection unit 105 acquires the fuel efficiency associated with the sum value of the battery weight and the package weight, and acquires a value obtained by dividing the total flight distance by the acquired fuel efficiency as the sixth consumption amount information.

The selection unit 105 acquires seventh consumption amount information on the battery consumption amount for flying from the delivery destination B to the return point C in a state in which the package is not loaded on the unmanned aerial vehicle 20. The seventh consumption amount information is the battery consumption amount for a third route from the departure point A to the collection destination D. For the third route, the package weight does not influence the battery consumption amount because the package has been delivered. For example, the selection unit 105 acquires the fuel efficiency associated with the battery weight, and acquires a value obtained by dividing the total flight distance by the acquired fuel efficiency as the seventh consumption amount information.

The selection unit 105 selects the battery based on the remaining charge information, the fifth consumption amount information, the sixth consumption amount information, and the seventh consumption amount information. The selection unit 105 may select a battery 30 having a remaining charge equal to or more than the battery consumption amount, or may select a battery 30 having a little bit more energy as a margin, namely, a battery 30 having a remaining charge that is more than the battery consumption amount of energy by a predetermined value.

In Modification Example (9), it is possible to select the optimal battery 30 that does not wastefully consume energy when the unmanned aerial vehicle 20 flies from the departure point A to the collection destination D to collect the package, flies to the delivery destination B to deliver the package, and then returns to the return point C.

Modification Example (10)

For example, any two or more of Modification Examples (1) to (9) may be combined.

For example, the battery installation system 1 may include an automatic battery loading device for automatically loading the battery 30 selected by the selection unit 105 on the unmanned aerial vehicle 20. For example, the automatic battery loading device may have a robotic arm to grip the battery 30 and install the battery 30 in the unmanned aerial vehicle 20. For example, the automatic battery loading device may have a belt conveyor to transport and install the battery 30 in the unmanned aerial vehicle 20. In this case, the processing execution unit 106 instructs the automatic battery loading device to install the battery 30 selected by the selection unit 105 in the unmanned aerial vehicle 20. For example, the automatic battery loading device controls the robot arm or controls the rotation of the belt conveyor in accordance with the instruction.

For example, the battery installation system 1 may include an automatic package loading device for automatically loading the package. For example, the automatic package loading device may have a robotic arm to grip the package and place the package in the catcher of the unmanned aerial vehicle 20. For example, the automatic package loading device may have a belt conveyor to transport the package to the unmanned aerial vehicle 20 and place the package in the catcher. In this case, the control unit 11 instructs the automatic package loading device to transport the package. For example, the automatic package loading device controls the robot arm or controls the rotation of the belt conveyor in accordance with the instruction.

For example, the battery installation system 1 may include an alarm for notifying the administrator of the battery 30 selected by the selection unit 105. The alarm may be any alarm that enables visual or audible identification of which battery 30 has been selected. For example, the battery installation system 1 includes a light emitting unit (e.g., LED light) prepared for each battery 30, and the processing execution unit 106 may be configured to cause the light emitting unit corresponding to the battery 30 selected by the selecting unit 105 to emit light. For example, the battery installation system 1 may include a buzzer for each battery 30, and the processing execution unit 106 may be configured to sound the buzzer corresponding to the battery 30 selected by the selection unit 105.

There has been described a case in which, for example, a box in which a product ordered from an Internet shopping mall is packed corresponds to a package, but the package is not limited thereto. The unmanned aerial vehicle 20 may be configured to transport various packages in logistics. For example, the package may be an item exchanged between individuals on an internet auction or a flea market site, or a product sold by a physical shop, such as a convenience store. For example, the present invention may be applied to a situation in which food or drink prepared at a restaurant is delivered, and in this case the food or drink may correspond to the package.

For example, the battery installation system 1 may be used in a situation other than a situation in which a package is delivered, and may be used, for example, in an information providing service for providing information on a certain site. For example, the battery installation system 1 may be used in a situation in which the unmanned aerial vehicle 20 flies to the movement destination indicated by the location information and photographs the movement destination state by a camera. As another example, the unmanned aerial vehicle 20 may use the battery installation system 1 in a situation in which the sensor unit 24 detects information on the temperature, the wind, and the like of the movement destination. In this case, a package is not loaded on the unmanned aerial vehicle 20, and therefore the consumption amount information indicates the battery consumption amount for the unmanned aerial vehicle 20 to move to the movement destination without a package being loaded thereon. Specifically, the consumption amount information indicates the battery consumption amount for the unmanned aerial vehicle 20 to photograph the movement destination state by a camera, or the battery consumption amount for the unmanned aerial vehicle 20 to detect information on the temperature, the wind, and the like of the movement destination by the sensor unit 24.

For example, when a plurality of types of unmanned aerial vehicles 20 are made available, a function for acquiring a battery consumption amount may be defined for each unmanned aerial vehicle 20. For example, the battery consumption amount may be calculated without using the battery weight information. For example, the selection unit 105 may add batteries 30 to the candidate list by calculating the battery consumption amount based on only the package weight information and the location information without using the battery weight information, and then select a battery 30 from among those batteries 30 based on the battery weight. For example, the selection unit 105 may calculate the battery consumption amount based on only the location information without using the battery weight information or the package weight information, and select the battery having the lightest weight among the batteries 30 having a remaining charge equal to or more than the calculated battery consumption amount. For example, when there are a plurality of batteries 30 having a sufficient remaining charge, the selection unit 105 may select a battery 30 having the smallest battery consumption amount in place of the battery weight. For example, an estimated battery consumption amount for each area on a map may be stored in the data storage unit 100, and the selection unit 105 may select a battery 30 based on the estimated battery consumption amount associated with the area including the location information. In this case, the estimated battery consumption amount may be corrected in accordance with the battery weight information and the package information.

For example, when the selection unit 105 has selected a plurality of batteries 30, the plurality of batteries 30 may be displayed on the selection result screen G. In this case, the batteries 30 may be sorted in ascending order of the battery weight. For example, when the selection unit 105 has selected a plurality of batteries 30, the battery having the second lightest weight may be selected. For example, the package weight information may not be particularly considered, and only the battery weight information may be considered in regard to the weight. For example, the processing to be executed by the processing execution unit 106 is not limited to the example described in the embodiment, and for example, only information for identifying the battery 30 may be output, or a sound indicating the battery 30 may be output from a speaker.

There has been described as an example a case in which the battery installation system 1 includes the delivery management device 10, the unmanned aerial vehicle 20, the battery 30, and the charger 40, but it suffices that the battery installation system 1 includes one or more computers, and may include another computer such as a server computer. For example, each function described above may be implemented by any one of the computers of the battery installation system 1. The functions described as being implemented by the delivery management device 10 may be implemented by the unmanned aerial vehicle 20. In this case, each function is mainly implemented by the control unit 21 of the unmanned aerial vehicle 20, and the data described as being stored in the data storage unit 100 may be stored in a database server external to the battery installation system 1.

The invention claimed is:

1. A battery installation system, comprising at least one processor configured to:
   acquire remaining charge information on a remaining charge of each of a plurality of batteries which are installable in an unmanned aerial vehicle;
   acquire battery weight information on a weight of each battery;

acquire location information on a movement destination of the unmanned aerial vehicle;
acquire remaining charge prediction information on each of a plurality of batteries being charged wherein the remaining charge prediction information is an amount of charge in a given battery based on a time until the given battery is to be installed in the unmanned aerial vehicle;
select, based on the remaining charge information, the battery weight information, the location information, and the remaining charge prediction information, from among the plurality of batteries, a battery having a remaining charge equal to or more than a battery consumption amount for moving to the movement destination; and
execute processing for installing the selected battery in the unmanned aerial vehicle;
wherein the processing is processing of outputting identification information on the selected battery and identification information on a package to be transported by the unmanned aerial vehicle in association with each other;
instruct the unmanned aerial vehicle to deliver the package;
wherein the unmanned aerial vehicle delivers the package; and
wherein the remaining charge prediction information is acquired by multiplying an amount of increase in a remaining charge per unit time period by a time period from a current point in time until the time the given battery is to be installed in the unmanned aerial vehicle.

2. The battery installation system according to claim 1, wherein the location information includes information on at least one of a delivery destination or a collection destination of a package to be transported by the unmanned aerial vehicle,
wherein the at least one processor is configured to:
acquire package weight information on the weight of the package, and
select a battery further based on the package weight information.

3. The battery installation system according to claim 1, wherein the at least one processor is configured to select a battery having the lightest weight when there are a plurality of batteries having a remaining charge equal to or more than the battery consumption amount.

4. The battery installation system according to claim 1, wherein the at least one processor is configured to:
acquire, based on the battery weight information and the location information, consumption amount information on the battery consumption amount; and
select a battery based on the remaining charge information and the consumption amount information.

5. The battery installation system according to claim 1, wherein the location information includes information on at least one of a delivery destination or a collection destination of a package to be transported by the unmanned aerial vehicle,
wherein the at least one processor is configured to:
acquire center-of-gravity information on a center of gravity exhibited when the package is loaded on the unmanned aerial vehicle, and
select a battery further based on the center-of-gravity information.

6. The battery installation system according to claim 1, wherein the at least one processor is configured to acquire transportation method information on a transportation method of a package to be transported by the unmanned aerial vehicle, and
select a battery further based on the transportation method information.

7. The battery installation system according to claim 1, wherein the at least one processor is configured to acquire wind information on a flight route of the unmanned aerial vehicle, and
select a battery further based on the wind information.

8. The battery installation system according to claim 1, wherein the at least one processor is configured to acquire temperature information on a temperature on a flight route of the unmanned aerial vehicle, and
select a battery further based on the temperature information.

9. The battery installation system according to claim 1, wherein the at least one processor is configured to:
acquire time information on a time specified for the movement destination, and
acquire the remaining charge prediction information based on the time information.

10. The battery installation system according to claim 1, wherein the location information includes information on at least one of a delivery destination or a collection destination of a package to be transported by the unmanned aerial vehicle,
wherein the at least one processor is configured to acquire package size information on a size of the package, and
select a battery further based on the package size information.

11. The battery installation system according to claim 1, wherein the location information includes information on a delivery destination of a package to be transported by the unmanned aerial vehicle,
wherein the unmanned aerial vehicle is configured to be loaded with a package at a departure point, fly to the delivery destination to deliver the package, and return to a return point, and
wherein the at least one processor is configured to:
acquire first consumption amount information on the battery consumption amount for flying from the departure point to the delivery destination in a state in which the package is loaded on the unmanned aerial vehicle;
acquire second consumption amount information on the battery consumption amount for flying from the delivery destination to the return point in a state in which the package is not loaded on the unmanned aerial vehicle; and
select a battery based on the remaining charge information, the first consumption amount information, and the second consumption amount information.

12. The battery installation system according to claim 1, wherein the location information includes information on a collection destination of a package to be transported by the unmanned aerial vehicle,
wherein the unmanned aerial vehicle is configured to fly from a departure point to the collection destination to collect the package, and return to a return point, and
wherein the at least one processor is configured to:
acquire third consumption amount information on the battery consumption amount for flying from the departure point to the collection destination in a state in which the package is not loaded on the unmanned aerial vehicle;

acquire fourth consumption amount information on the battery consumption amount for flying from the collection destination to the return point in a state in which the package is loaded on the unmanned aerial vehicle; and select a battery based on the remaining charge information, the third consumption amount information, and the fourth consumption amount information.

13. The battery installation system according to claim 1, wherein the location information includes information on each of a delivery destination and a collection destination of a package to be transported by the unmanned aerial vehicle, wherein the unmanned aerial vehicle is configured to fly from a departure point to the collection destination to collect the package, fly to the delivery destination to deliver the package, and return to a return point, and wherein the at least one processor is configured to:
acquire fifth consumption amount information on the battery consumption amount for flying from the departure point to the collection destination in a state in which the package is not loaded on the unmanned aerial vehicle;

acquire sixth consumption amount information on the battery consumption amount for flying from the collection destination to the delivery destination in a state in which the package is loaded on the unmanned aerial vehicle;

acquire seventh consumption amount information on the battery consumption amount for flying from the delivery destination to the return point in a state in which the package is not loaded on the unmanned aerial vehicle; and select a battery based on the remaining charge information, the fifth consumption amount information, the sixth consumption amount information, and the seventh consumption amount information.

14. A battery installation method, comprising:
acquiring remaining charge information on a remaining charge of each of a plurality of batteries which are installable in an unmanned aerial vehicle;

acquiring battery weight information on a weight of each battery;

acquiring location information on a movement destination of the unmanned aerial vehicle;

acquiring remaining charge prediction information on each of a plurality of batteries being charged wherein the remaining charge prediction information is an amount of charge in a given battery based on a time until the given battery is to be installed in the unmanned aerial vehicle;

selecting, based on the remaining charge information, the battery weight information, the location information, and the remaining charge prediction information, from among the plurality of batteries, a battery having a remaining charge equal to or more than a battery consumption amount for moving to the movement destination; and executing processing for installing the selected battery in the unmanned aerial vehicle;

wherein the processing is processing of outputting identification information on the selected battery and identification information on a package to be transported by the unmanned aerial vehicle in association with each other;

instructing the unmanned aerial vehicle to deliver the package;

wherein the unmanned aerial vehicle delivers the package;

wherein the remaining charge prediction information is acquired by multiplying an amount of increase in a remaining charge per unit time period by a time period from a current point in time until the time the given battery is to be installed in the unmanned aerial vehicle.

15. A non-transitory computer-readable information storage medium for storing a program for causing a computer to:
acquire remaining charge information on a remaining charge of each of a plurality of batteries which are installable in an unmanned aerial vehicle;

acquire battery weight information indicating a weight of each battery;

acquire location information on a movement destination of the unmanned aerial vehicle;

acquire remaining charge prediction information on each of a plurality of batteries being charged wherein the remaining charge prediction information is an amount of charge in a given battery based on a time until the given battery is to be installed in the unmanned aerial vehicle;

select, based on the remaining charge information, the battery weight information, the location information, and the remaining charge prediction information, from among the plurality of batteries, a battery having a remaining charge equal to or more than a battery consumption amount for moving to the movement destination; and execute processing for installing the selected battery in the unmanned aerial vehicle;

wherein the processing is processing of outputting identification information on the selected battery and identification information on a package to be transported by the unmanned aerial vehicle in association with each other;

instruct the unmanned aerial vehicle to deliver the package;

wherein the unmanned aerial vehicle delivers the package;

wherein the remaining charge prediction information is acquired by multiplying an amount of increase in a remaining charge per unit time period by a time period from a current point in time until the time the given battery is to be installed in the unmanned aerial vehicle.

* * * * *